(12) United States Patent  (10) Patent No.: US 8,054,495 B2
Goldstein et al.  (45) Date of Patent: Nov. 8, 2011

(54) DIGITAL DOCUMENTS, APPARATUS, METHODS AND SOFTWARE RELATING TO ASSOCIATING AN IDENTITY OF PAPER PRINTED WITH DIGITAL PATTERN WITH EQUIVALENT DIGITAL DOCUMENTS

(75) Inventors: Ira Goldstein, Concord, MA (US); Jose Antonio Magana, Barcelona (ES); Manuel Angel Albarran Moyo, Barcelona (ES); Jean-Michel Combe, Montroux Domene (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 2213 days.

(21) Appl. No.: 10/820,630

(22) Filed: Apr. 7, 2004

(65) Prior Publication Data

US 2005/0243369 A1  Nov. 3, 2005

(51) Int. Cl.
 *G06K 15/00* (2006.01)
(52) U.S. Cl. ............ 358/1.18; 358/1.15; 358/3.28; 345/179; 715/232; 715/210; 235/472.02; 235/472.03
(58) Field of Classification Search .......... 400/76; 235/494, 472.02, 472.03; 345/723, 179, 345/76, 173; 705/401, 410; 358/1.18, 473, 358/1.15, 3.28; 715/232, 210; 283/94
See application file for complete search history.

(56) References Cited

U.S. PATENT DOCUMENTS

| 6,651,894 | B2 * | 11/2003 | Hattori et al. ............... 235/494 |
| 6,915,281 | B2 * | 7/2005 | Coffy et al. ................... 705/410 |
| 7,050,181 | B2 * | 5/2006 | Korst et al. .................. 358/1.15 |
| 7,108,192 | B2 * | 9/2006 | Lapstun ........................ 235/494 |
| 7,111,230 | B2 * | 9/2006 | Euchner et al. .............. 715/232 |
| 7,131,058 | B1 * | 10/2006 | Lapstun et al. .............. 715/210 |
| 7,136,054 | B2 * | 11/2006 | Wang et al. .................... 345/179 |
| 2002/0050982 | A1 * | 5/2002 | Ericson ......................... 345/173 |
| 2002/0054778 | A1 * | 5/2002 | Ericson et al. ................. 400/76 |
| 2002/0065853 | A1 | 5/2002 | Takahashi et al. |
| 2003/0001020 | A1 * | 1/2003 | Kardach ...................... 235/494 |
| 2003/0066896 | A1 * | 4/2003 | Pettersson et al. ........... 235/494 |
| 2003/0122746 | A1 * | 7/2003 | Rignell ........................... 345/76 |
| 2003/0214528 | A1 * | 11/2003 | Pierce et al. ................. 345/723 |

(Continued)

FOREIGN PATENT DOCUMENTS

WO  01/26032 A1  4/2001

(Continued)

OTHER PUBLICATIONS

"Anoto Pattern and Digital Paper," Internet: <http://www.anotofunctionality.com/navigate.asp?PageID=73> 1 page total (Sep. 6, 2003).

(Continued)

*Primary Examiner* — Twyler Haskins
*Assistant Examiner* — Nicholas Pachol

(57) ABSTRACT

A method is provided of associating in computer memory (i) a digital electronic version of printed human-discernible content of a printed document comprising a sheet having a machine-readable pattern adapted to enable the position of a digital pattern reading device to be determined and said human-discernible content with (ii) the identity of a sheet upon which the content is printed, the method comprising:
 printing the content onto a sheet using a printer, said sheet comprising a pre-patterned sheet that has been pre-printed with said pattern;
 transferring a machine-readable identity code between said printer and said sheet at around the time of printing said content; and
 storing a correlation between said identity code and said digital electronic version in computer memory.

23 Claims, 26 Drawing Sheets

U.S. PATENT DOCUMENTS

| | | | |
|---|---|---|---|
| 2004/0002926 A1* | 1/2004 | Coffy et al. | 705/401 |
| 2004/0035935 A1 | 2/2004 | Takahashi et al. | |
| 2005/0052700 A1* | 3/2005 | Mackenzie et al. | 358/1.18 |
| 2005/0146518 A1* | 7/2005 | Wang et al. | 345/179 |
| 2005/0188306 A1* | 8/2005 | Mackenzie | 358/473 |
| 2006/0082557 A1* | 4/2006 | Ericson et al. | 345/179 |

FOREIGN PATENT DOCUMENTS

| | | |
|---|---|---|
| WO | WO-01/71475 A1 | 9/2001 |
| WO | 01/74598 A1 | 10/2001 |
| WO | 02/082366 A1 | 10/2002 |

OTHER PUBLICATIONS

"Digital Notes," Internet: <http://www.anotofunctionality.com/navigate.asp?PageID=86> 1 page total (Sep. 6, 2003).

"The Digital Oxford EASYBOOK® Offers Extensive Possibilities," Internet: <http://www.landre.de/eng/office/magic-2.html> pp. 1-2 (Sep. 6, 2003).

"Digital Paper," Internet: <http://www.anotofunctionality.com/navigate.asp?PageID=97> pp. 1-3 (May 12, 2003).

"Digital Pens," Internet: <http://www.anotofunctionality.com/navigate.asp?PageID=74> 1 page total (Sep. 6, 2003).

"Digital Pens," Internet: <http://www.anotofunctionality.com/navigate.asp?PageID=96> pp. 1-2 (Sep. 6, 2003).

"Digital Pens Use With Mobile Phones," Internet: <http://www.anotofunctionality.com/navigate.asp?PageID=77> 1 page total (Sep. 6, 2003).

"Digital Pens Use With Personal Computers," Internet: <http://www.anotofunctionality.com/navigate.asp?PageID=78> 1 page total (Sep. 6, 2003).

"Digital Service," Internet: <http://www.anotofunctionality.com/navigate.asp?PageID=98> pp. 1-3 (Sep. 6, 2003).

"E-Mail," Internet: <http://www.anotofunctionality.com/navigate.asp?PageID=83> pp. 1-3 (Sep. 6, 2003).

"Fax," Internet: <http://www.anotofunctionality.com/navigate.asp?PageID=84> pp. 1-3 (Sep. 6, 2003).

"Freedom of Expression," Internet: <http://www.anotofunctionality.com/navigate.asp?PageID=82> 1 page total (Sep. 6, 2003).

"Graphical SMS," Internet: <http://www.anotofunctionality.com/navigate.asp?PageID=85> pp. 1-3 (Sep. 6, 2003).

Guimbretière, F., "Paper Augmented Digital Documents," *Department of Computer Science, Human-Computer Interaction Lab, University of Maryland*, pp. 1-10 (Apr. 2003).

"Hints & Tips," Internet: <http://www.anotofunctionality.com/navigate.asp?PageID=67> 1 page total (Sep. 6, 2003).

"Hints & Tips Using Your Digital Paper," Internet: <http://www.anotofunctionality.com/navigate.asp?PageID=93> 1 page total (Sep. 6, 2003).

"Hints & Tips Using Your Digital Pen," Internet: <http://www.anotofunctionality.com/navigate.asp?PageID=92> 1 page total (Sep. 6, 2003).

"Hints & Tips Using Digital Service," Internet: <http://www.anotofunctionality.com/navigate.asp?PageID=94> pp. 1-2 (Sep. 6, 2003).

"How Does it Work," Internet: <http://www.anotofunctionality.com/navigate.asp?PageID=24> 1 page total (Sep. 6, 2003).

"Possibilities," Internet: <http://www.anotofunctionality.com/navigate.asp?PageID=66> 1 page total (Sep. 6, 2003).

"News," Internet: <http://www.anotofunctionality.com/navigate.asp?PageID=122& ArticleID=592> pp. 1-2 (Sep. 6, 2003).

"Security," Internet: <http://www.anotofunctionality.com/navigate.asp?PageID=75> 1 page total (Sep. 6, 2003).

"Software and Addititonals," Internet: <http://www.anotofunctionality.com/navigate.asp?PageID=99> 1 page total (Sep. 6, 2003).

Subrahmonia, J., "Pen Computing: Challenges and Applications," *IBM Thomas J. Watson Research Center, to appear in Proceedings of the ICPR*, 7 pages total (2000).

"You to an Organization," Internet: <http://www.anotofunctionality.com/navigate.asp?PageID=125> 1 page total (Sep. 6, 2003).

"You to Someone Else," Internet: <http://www.anotofunctionality.com/navigate.asp?PageID=124> 1 page total (May 12, 2003).

"You to Yourself," Internet: <http://www.anotofunctionality.com/navigate.asp?PageID=123> 1 page total (Sep. 6, 2003).

"Written Notes Conquer the Digital World," Internet: <http://www.landre.eng/office/magic.html> pp. 1-2 (Sep. 6, 2003).

UK Search Report dated Aug. 25, 2005.

* cited by examiner

DIGITAL DOCUMENTS, APPARATUS, METHODS AND SOFTWARE RELATING TO ASSOCIATING AN IDENTITY OF PAPER PRINTED WITH DIGITAL PATTERN WITH EQUIVALENT DIGITAL DOCUMENTS

FIELD OF THE INVENTION

This invention relates to digital documents, and to apparatus, methods and software relating to associating an identity of paper printed with digital pattern with equivalent digital documents. More specifically, but not exclusively, printers, printed pages, methods of printing and/or editing printed pages, servers/processors and networks in which an association is made between either the printed digital pattern or an identity code printed on the page and an equivalent digital document at the time of printing human discernible content on the paper having printed digital pattern

BACKGROUND OF THE INVENTION

The invention arose out of a consideration of the work of Anoto Group AB and others in relation to digital pattern paper and digital pens. It is convenient to discuss the invention in that contextual background, but it will be appreciated that the invention is not restricted to use with any proprietary system.

PRIOR ART

The prior art Anoto digital pen and paper system is described on their website www.anotofunctionality.com. However, since the content of websites can change with time it is to be made clear that the prior art admitted is that which was published on their website no later than the day before the priority date of this patent application. It is also appropriate to include in this application itself a brief review of the Anoto system.

FIG. 1 shows schematically an A4 sheet 10 of Anoto digital paper. This comprises a part of a very large non-repeating pattern 12 of dots 14. The overall pattern is large enough to cover 60,000,000 square kilometers. The pattern 12 is made from dots which are printed using infra-red absorbing black ink. The dots 14 are spaced by a nominal spacing of 300 μm, but are offset from their nominal position a little way (about 50 μm), for example north, south, east or west, from the nominal position.

In WO 01/26032, a 4×4 array of dots is described, and also a 6×6 array of dots, to define a cell. Each cell has its dots at a unique combination of positions in the pattern space so as to locate the cell in the pattern space. The dot pattern of an area of the dot pattern space codes for the position of that area in the overall dot pattern space. The contents of WO 01/26032 are hereby incorporated by reference, with especial reference to the dot pattern and the pen.

The sheet 12 has a pale grey appearance due to the dots 14.

FIG. 2 schematically shows a digital pen 20 adapted to write human readable ink in non-machine-readable IR transparent ink and to read a position dot pattern in infra-red. The pen 20 has a housing 22, a processor 24 with access to memory 26, a removable and replaceable ink nib and cartridge unit 28, a pressure sensor 29 adapted to be able to identify when the nib is pressed against a document, an infra-red LED emitter 30 adapted to emit infra-red light, an infra-red sensitive camera 32 (e.g. a CCD or CMOS sensor), a wireless telecommunications transceiver 34, and a removable and replaceable battery 36. The pen 20 also has a visible wavelength warning light 38 (e.g. a red light) positioned so that a user of the pen can see it when they are using the pen, and a vibration unit 40 adapted to vibrate and to cause a user to be able to feel vibrations through the pen.

Such a pen exists today and is available from Anoto as the Logitech IO™ pen.

The pen, when in use writing on a page/marking a page, sees a 6×6 array of dots 14 and its processor 24 establishes its position in the dot pattern from that image. In use the LED 30 emits infra-red light which is reflected by the page 12 and detected by the camera 32. The dots 14 absorb the infra-red and so are detectable against the generally reflective background. Of course, the ink of the dots might be especially reflective in order to distinguish them (and the paper less reflective), or they may fluoresce at a different wavelength from the radiation that excites them, the fluorescent wavelength being detected. The dots 14 are detectable against the background page.

The processor 24 processes data acquired by the camera 32 and the transceiver 34 communicates processed information from the processor 24 to a remote complementary transceiver (e.g. to a receiver linked to a PC). Typically that information will include information related to where in the dot pattern the pen is, or has been, and its pattern of movement.

There are times when the processor 24 cannot determine its position in pattern space (the overall virtual space defined by the very large dot pattern). For example, if the pen is moved too fast over the pattern the processor cannot process the images fast enough. Also the pen may not be able to see where it is in the dot pattern. This can happen if the page 14 is marked or defaced by colorants, or the pattern covered up with something, or the field of view of the pattern is obscured. The user putting their finger in the way is a common reason why the processor fails to recognise the position of the pen. In order to alert the user to the fact that the pen is not able to determine its position properly the processor 24 is adapted to illuminate the light 38 and cause the vibrator 40 to vibrate. The user gets visual and tactile feedback that the camera is not seeing the dot pattern properly/that the pen is unable to determine its position properly.

There is a published paper, "Paper Augmented Digital Documents" by Francois Guimbretière, published in April 2003 which is concerned with associating a dot pattern, position-determining pattern, with a specific memory record of an electronic document so as to enable a user with a digital pen to edit or annotate the existing electronic document. Guimbretière says that it is desirable to print the position-determining pattern that covers the page at the same time as printing the text words, thereby establishing a nexus between the particular region of pattern on a page and the electronic/digital record equivalent to the text on the page, so that when a user writes on the page with a digital pen equivalent markings are recorded on the electronic/digital record.

Whilst Guimbretière would like to do the above he says that he cannot do it. He teaches an alternative approach. As an alternative to printing the position-determining pattern at the same time as the text (content), Guimbretière teaches the use of a system where text (human discernible content) is printed on sheets of paper having a pre-printed digital pattern. The sheets of paper, pre-printed with different regions of a position-determining dot pattern, each sheet relating to a different area of the pattern, are fed into the printer in a certain pre-defined, and known, order. An association between the digital/electronic version of the text (printed human discernible content) and the identity of the pre-printed sheet of digital paper is recorded in a processor based on the assumption that the correct sheet of paper was fed into the printer in the correct order, and that it is known what electronic document is being printed on what pre-patterned sheet. The processor of the system is then able to tie specific parts of a specific region of pattern with a specific electronic document, and with specific parts of the document, so that writing added by a digital pen is added at the correct place in the digital version of the printed document.

This system has the disadvantage that if the sheets of paper get jammed in the printer, or two sheets are fed through the printer at the same time, or someone takes a sheet of paper out of the printer for some reason, the correlation between the identity of the sheet of paper and the printed content can become unsynchronised, and when the paper documents are edited with a digital pen the printed paper pattern is the wrong one and the pen/system operates on the wrong electronic document.

Another problem with this approach is that it is necessary to put the pre-printed paper into the printer paper tray the right way up—or else whilst an association of pen-applied marks to the correct electronic document will be made, the marks will appear in the wrong places. Similarly, any lack of registration between the pre-printed pattern covering the page and the expected position of the text printed on top of the pattern will result in the electronic version of the pen-applied markings being mis-aligned with the electronic text.

Returning to the desire of Guimbretière to use one printer to print both the human discernible content and the Anoto-type digital pattern at the same time, that desire remains. However, we have realised that if it could be done there is an inherent disadvantage. That realisation is a factor in making the present invention. That realisation is that if the pattern and text (content) are printed simultaneously on the same printer each user who desires to print out a document having a digital pattern needs access to a high-resolution printer capable or printing the position determining pattern to a resolution good enough to allow pen strokes to be captured. This is beyond the capability of many existing printers (e.g. 150 dpi may not be good enough). This means that hundreds of millions of legacy printers cannot be used with such a system. Such a system would also place a high computational and memory burden on the printer and instructing PC. High-resolution printers that have sufficient resolution to print out the Anoto digital pattern are also often expensive.

SUMMARY OF THE INVENTION

According to a first aspect of the invention, there is provided a method of associating in computer memory (i) a digital electronic version of printed human-discernible content of a printed document comprising a sheet having a machine-readable pattern adapted to enable the position of a digital pattern reading device to be determined and said human-discernible content with (ii) the identity of a sheet upon which the content is printed, the method comprising:
  printing the content onto a sheet using a printer, said sheet comprising a pre-patterned sheet that has been pre-printed with said pattern;
  transferring a machine-readable identity code between said printer and said sheet at around the time of printing said content; and
  storing a correlation between said identity code and said digital electronic version in computer memory.

Thus, the printer transfers the code, or conveys it, to or from the sheet. Said identity code may be read from said sheet by said printer, or said identity code may be printed on said sheet by said printer.

The firmware of the printer may be updated to control when and how information relating to the identity code is transferred to or from the printer. For example, at what stage during the print operation the information is transmitted.

In the embodiment where the printer reads the identity code, the firmware or software of the printer may be updated to control when and how the identity code is read from the sheet. For example, the firmware may know at what stage of the print operation the identity code should be read, where on the sheet to read the identity code, what to do if the identity code is not found at the expected location on the sheet. The firmware may control the identity code reader to look at a different region of the sheet for the identity code if it is not found at its expected location.

Alternatively or additionally, software or firmware other than on the printer may be changed to enable the invention to be performed. For example printer driver software on a computer that sends a print command to the printer may be provided with the appropriate functionality. The act of upgrading software/firmware on the printer, or elsewhere, is envisaged, and desired to be protected, as is the provision of appropriate "upgrade" software/firmware.

A plurality of sheets may have the same pre-printed pattern and may be given individual identities by using said printer to apply different machine-readable identity codes to each of them at around the time of printing each sheet.

Said machine-readable identity code may comprise at least one code from the group:
(i) a pattern of dots;
(ii) a pattern of lines;
(iii) a pattern of printed objects whose positions and/or shapes code for an identity;
(iv) a position determining pattern;
(v) a bar code.

The code may comprise a digital stamp, typically applied to the sheets as they are printed with content. Applying the code/digital stamp contemporaneously with applying the content to the sheet ensures that there are no changes of the content between when it was associated with the code and when the document was printed.

Only a small stamp/code need be printed. This reduces the burden on the printer: only a small memory and computational burden need be placed on the printer. This makes it suitable for use with the billions of existing printers.

When the identity code is read from the sheet, the human-discernible content may comprise document-type content and user-specific content, wherein one from the group:
(i) document-type content; and
(ii) user-specific content
can be selected by a user, and the other from said group can be obtained from a pre-determined correlation between the identity code that has been read by the printer and the digital electronic version of associated content.

The document-type content can be the fixed headings on a specific type of form that is to be printed. The user-specific content can be the user's personal details that are to be pre-filled into the form. A pre-filled form can quickly and easily be printed out according to this aspect of the invention by selecting the required type of form and feeding user-specific pre-patterned paper into the printer. Alternatively, a user can select the person for whom the form is to be printed, and form-specific pre-patterned paper can be fed into the printer. A further advantage to this aspect of the invention is that a user can take their specific pre-patterned paper to any suitably arranged printer (which may be at any site with a suitable printer) to print out a pre-filled document.

Printing pre-filled forms on demand has the advantage that every page is pre-filled when it is needed. Details of the form and user may change over time, and this aspect of the invention ensures that the latest details are used in the document. In previous solutions, to pre-fill a form it was needed to query a database with a PDF skeleton and print the full result of the query. This aspect of the invention removes the need to print the full result of a query.

According to another aspect of the invention there is provided a method of associating in computer memory a digital electronic version of printed human discernible content of a printed document with a position in a pen or other digital device readable pattern printed on said document, the method comprising:

introducing into a content printer a page of pre-patterned digital paper that has been pre-printed with a position-determining pattern, said pattern being adapted to enable a digital pen to acquire information from said pattern to enable the position of said pen on said pattern to be determined;

printing said content on said digital paper using said content printer;

using said content printer to perform an act at substantially the time of printing said content onto said pre-patterned paper, in addition to printing content, that is instrumental in associating in computer memory, a digital electronic version of said content with an identity of the particular sheet of digital paper upon which said content is printed, said association not being essentially dependent upon a knowledge of the order of pages of digital pages in the printer, prior to a printing operation.

Thus the association of the pre-printed pattern with the content is performed at the time of printing, and so problems with pages of pre-printed patterned paper being removed from the paper tray of the printer, being in the wrong order, are avoided. The association of pattern space and content is an act performed late in the process of getting a page of pattern plus content paper, rather than early, upstream, in that process. The association may involve transferring a code from the content printer to the printed document (printing on the document), or transferring a code from the document to computer memory, via the printer acting as a reader of the code.

In some embodiments a content printer which prints said content onto said pre-patterned paper has a pattern reading device. The content printer may acquire data from said pre-printed pattern on a sheet of paper to be printed with content to enable the identity of pattern on said sheet to be established, thereby enabling said association to be made in computer memory. The content printer uses data from a digital electronic version of content to print said content onto said pre-patterned sheet and said association is made in computer memory between said digital electronic version of said content and said identity of pattern read by the printer. Said pre-printed pattern may be associated in computer memory with specific digital electronic content and wherein upon recognition of said pattern using data acquired by said pattern reading device of said content printer, said specific digital electronic content may be caused to be printed onto said pre-patterned sheet as human discernible content.

Different users may have different pattern associated with them. Upon recognition of their pattern from data from said content printer's pattern reading device said content printer may be caused to print user-specific content onto said sheet.

Said pre-printed pattern may be printed using a first printer and wherein said content may be printed using a second, different, printer.

According to another aspect of the invention, there is provided a method of associating in computer memory a digital electronic version of printed human discernible content of a printed document with an identity code adapted to identify said document, the method comprising:

using a plurality of pages of pre-patterned digital paper that have been pre-printed with a position-determining pattern, said pattern being adapted to enable a digital pen to acquire information from said pattern to enable the position of said pen on said pattern to be determined; printing said content on said digital paper using a content printer;

using said content printer to be instrumental in conveying an identity code to or from the paper;

and associating in computer memory, using said code transferred, at the time of printing said content onto said pre-patterned paper, a digital electronic version of said content with the identity code for the particular sheet of digital paper upon which said content is printed.

The identity code adapted to distinguish a specific sheet of pre-pattern digital paper may be printed onto said specific sheet as part of an operation of printing said content onto said specific sheet, said identity code being capable of being used to distinguish data acquired by a digital pen from said specific sheet from data acquired by said pen from other sheets of pre-patterned paper having the same position-determining pattern on them as does said specific sheet.

The code may be a dot pattern, for example of larger dots, requiring a lower resolution printer, to print than does the pattern. The code may be a barcode, or any machine-readable code.

An identity code adapted to distinguish a specific sheet of pre-patterned digital pattern may be printed on said specific sheet in an operation prior to printing said content onto said specific sheet, and wherein a content printer which prints said content onto said pre-patterned paper may have an identity code reading device, said content printer being capable of acquiring data from said identity code, said identity code being capable of being used to distinguish data acquired by a digital pen from said specific sheet from data acquired by said pen from other sheets of pre-patterned paper having the same position-determining pattern on them as does said specific sheet, to enable said association to be made between said digital electronic version of said content and said identity code.

A plurality of different identity codes may be printed on a respective plurality of pre-patterned sheets each having the same pre-printed position-determining pattern, said identity codes enabling a digital pen to distinguish data acquired from each sheet from data acquired from other sheets.

It is preferred, in many embodiments, to have the code readable by the same digital pen that will read pen strokes on the pattern. This may require a software change in the pen, or off-pen processor that processes signals from the pen.

An identity code may be associated in computer memory with specific digital electronic content and wherein upon recognition of said identity code using data acquired by said identity code reading device of said content printer, said specific digital electronic content may be caused to be printed onto said pre-patterned sheet as human discernible content.

Different users may have different identity codes associated with them and wherein upon recognition of their identity code from data from said content printer's identity code reading device said content printer is caused to print user-specific content onto said sheet.

The identity code may be printed in an area of said pre-patterned paper which is from the group:
(i) free of pattern;
(ii) substantially free of pattern.

An area of the sheets from the group:
(i) all of a surface of each of the sheets;
(ii) substantially all of a surface of each of the sheets;
(iii) at least half of the surface area of each of the sheets;
(iv) at least a tenth of the surface area of each of the sheets; may be pre-printed with pattern. Sometimes there may be only one, or a few, checkboxes in a form that are patterned. At other times the whole page may carry pattern.

Said pre-printed pattern may be printed using a first printer and said content and said identity code are printed by a second, different, printer. Said first printer may have substantially better print resolution than does said second printer. Said second printer may not be capable of printing said pattern satisfactorily, or it may be configured for the time being not to be able to print as well as the pattern printed (e.g. if there is a variable resolution on the printer it may be set to a lower resolution—since print quality for content may not be so critical as print quality for pattern). Pre-printed digital paper may be taken from said first printer and put into a plurality of second printers.

The above concepts allow us to use cheaper, or existing legacy, printers to print content and/or identity code, and to use more specialised, often expensive, printers to print the pattern. For example, a pattern printer may need higher resolution to print the dots of a pattern properly, and/or different inks to the content printer. One pattern printer can provide pre-patterned paper for several or many code/content printers.

According to another aspect of the invention, there is provided a sheet of digital paper having a position-determining pattern, readable by a digital pen, printed at a first resolution, and an identifying code, also readable by a digital pen, printed at a second resolution.

The first resolution of the position-determining pattern may be higher than the second resolution of the unique identifying code. Alternatively, the first and second resolutions may be the same.

The sheet of digital paper may have human discernible content printed at a lower resolution than said first resolution.

According to another aspect of the invention, there is provided a plurality of sheets of digital paper, each having the same position-determining pattern, readable by a digital pen, printed at a first resolution, and each also having a unique identifying code printed on them at a second resolution, the identifying codes being readable by a digital pen and adapted to distinguish data from one sheet from data from another sheet.

The first resolution of the position-determining pattern may be higher than the second resolution of the unique identifying code. Alternatively, the first and second resolutions may be the same.

The identifying code may be one of a barcode, a position-determining dot pattern that is different to the dot pattern on the rest of the sheet, an optically recognizable character string, or any other machine-readable code. In many embodiments the identifying code is a machine-readable code that is not meaningful/readable by humans unaided (e.g. not alphanumeric characters). In many embodiments the code is not the file name for the electronic document, or a direct data structure address for the electronic content, but rather an intermediate, linking, code which a processor can use to establish the electronic address of the content.

According to another aspect of the invention, there is provided a digital printer having a stack of pre-patterned digital paper in a paper supply, said stack of paper comprising a plurality of sheets of digital paper having a digital position-determining pattern pre-printed on them adapted to enable a digital pen to acquire information from the pattern to enable the position of the pen relative to the pattern to be determined, and wherein the printer is adapted to be linked to a computer for receiving printing commands from the computer and wherein the sheets of pre-printed paper are stacked in an order that is not known to the computer.

The stack of paper may be from the group:
(i) sheets of paper each having the same pattern on them;
(ii) sheets of paper each having different pattern on them;
(iii) sheets of paper each having the same pattern on them and each having a different pre-printed unique identifier;
(iv) sheets of paper each having different pattern on them and each having a different pre-printed unique identifier.

A stack of paper with each sheet having a different pre-printed unique identifier has the advantage that the printer can scan the unique identifier as the paper is passing through the printer, and said computer can associate the scanned identifier with an electronic copy of the document that is printed on the sheet.

According to another aspect of the invention, there is provided a network comprising a computer and a digital printer, the printer having a stack of pre-patterned digital paper in a paper supply, said stack of paper comprising a plurality of sheets of digital paper having a digital position-determining pattern pre-printed on them adapted to enable a digital pen to acquire information from the pattern to enable the position of the pen relative to the pattern to be determined, wherein the computer does not yet have an association in computer memory between a memory file and the pattern of any specific sheet of pre-patterned paper in said printer.

Said printer may be adapted to apply an identifying code to said pre-patterned sheets when they are printed with content, and wherein said computer is adapted to associate each respective identity code with an electronic version of whatever content is printed onto respective said sheets.

Said printer may be adapted to read said pre-printed pattern and to provide pattern-identifying data to said computer to associate in computer memory the region of pattern, or identity of pattern, printed upon each sheet with the electronic version of content printed on each sheet.

Said printer may be adapted to read a pre-printed identity code and to provide identity code-identifying data to said computer to associate in computer memory the identity code printed upon each sheet with the electronic version of content printed on each sheet.

The printer may be adapted to print a document having document-type content (e.g. a particular type of form such as expenses claim form, product ordering form, staff assessment form etc.), and also user specific type content (e.g. user's name, address, charge out rate, normal hours of working for that user, number of days holiday left as yet untaken by that user, the user-specific type content, and indeed the document-type content do not have to be static in time; the printer having user input means (e.g. a button, hand-manipulated user-printer instruction interface, a screen with scroll down menu options operated by the user at the printer) to enable the use to input to the printer via the user input means either (i) a selection from document type content or (ii) a selection from user-specific type content, and the printer also having content-acquisition means (e.g. a communications port) adapted to acquire the other of (i) and (ii) from an external source (e.g. a server), using a pre-determined association between information acquired from the camera or sensor and a digital electronic version of the associated content.

For example, the camera or sensor may read the identity of a sheet of paper, a user may select a specific form or identify themselves using user input means on the printer (and for example load the printer with paper either specific to them, or specific to a particular form), the printer reads the paper, and conveys to an external soured (e.g. a PC or server) the identify of the paper. The external source links the identity of the paper with whichever specific content of the type of content that has not been input by the user, and sends the relevant specific content of that, non-user input, type to the printer. The external source may also receive the identity of the user-input specific content (e.g. user name, or form type) from the printer and may send specific content derived from that to the printer (i.e. the external source may send both content types to the printer.

Some of the data memory, or processing may reside in the printer itself. At one extreme, there may be no communication outside of the printer: it may have the memory containing content-identity vs actual content within its own housing.

According to another aspect of the invention, there is provided apparatus adapted to print documents comprising human readable content and digital pen-readable pattern adapted to enable the position of a digital pen on the pattern to be determined, the apparatus comprising:
(i) a content printer;
(ii) a control processor;
(iii) a computer content memory accessible by said processor and containing an electronic version of content to be printed;
(iv) a paper store provided with said printer and adapted to receive a plurality of sheets of pre-patterned paper pre-printed with said pattern;
(v) software accessible to said processor and runable on said processor adapted to cause said printer to print said electronic version of said content onto said pre-patterned paper from said paper store;
(vi) pattern-to-electronic memory location software accessible by said processor and runable on said processor;
said pattern-to-electronic memory location software when running on said processor causing a concordance to be established in a computer memory between the location in content memory of an electronic version of content and the position in pattern space of the pattern of the sheet upon which the content is printed by the processor, the concordance for sheets of pre-patterned paper between the location in computer memory and the position in pattern space at which content corresponding to said electronic content is printed being established at the time of a print operation using an act performed by the printer to interact with the sheets of paper that are printed with content, in addition to printing the content, the act comprising an act from the group:
(i) printing a machine-readable identity code onto the paper;
(ii) reading an identity code from the sheets of paper; and
(iii) another positive act involving an interaction between the printer and the sheets of paper to transfer an identity code between the printer/paper.

The printer may have a pattern reader adapted to provide data to said processor to enable the identity or region of pattern pre-printed on a particular sheet of patterned paper to be established, and wherein said pattern-to-electronic memory location software may be adapted to use data from said printer's pattern reader to link pattern space positions or identities with associated locations in computer content memory, thereby linking electronic versions of content printed onto particular sheets of paper with the pattern space for which the pre-printed pattern of those sheets code.

According to another aspect of the invention, there is provided apparatus adapted to print documents comprising human readable content and digital pen-readable pattern adapted to enable the position of a digital pen on the pattern to be determined, the apparatus comprising:
(i) a content printer;
(ii) a control processor;
(iii) a computer content memory accessible by said processor and containing an electronic version of content to be printed;
(iv) a paper store provided with said printer and adapted to receive a plurality of sheets of pre-patterned paper pre-printed with an identifying code;
(v) software accessible to said processor and runable on said processor adapted to cause said printer to print said electronic version of said content onto said pre-patterned paper from said paper store;
(vi) pattern-to-electronic memory location software accessible by said processor and runable on said processor;
said pattern-to-electronic memory location software when running on said processor causing a concordance to be established in a computer memory between the location in content memory of an electronic version of content and the identity of the identifying code of the sheet upon which the content is printed by the processor, the concordance for sheets of pre-patterned paper between the location in computer memory and the identity of the identifying code on which content corresponding to said electronic content is printed being established at the time of a print operation, using an act performed by the printer to interact with the sheets of paper that are printed with content in addition to printing the content, the act comprising an act from the group:
(i) printing an identity code onto the sheets of paper;
(ii) reading an identity code from the sheets of paper; and
(iii) another positive act involving an interaction between the printer and the sheets of paper to transfer an identity code between the printer/paper.

The printer may have an identifying code reader adapted to provide data to said processor to enable the identity of a particular sheet of patterned paper to be established, and wherein said pattern-to-electronic memory location software may be adapted to use data from said printer's identifying code reader to link identifying codes with associated locations in computer content memory, thereby linking electronic versions of content printed onto particular sheets of paper with the identifying code for which the pre-printed pattern of those sheets code.

According to another aspect of the invention, there is provided apparatus adapted to print documents comprising human readable content and digital pen-readable pattern adapted to enable the position of a digital pen on the pattern to be determined, the apparatus comprising:
(i) a content printer;
(ii) a control processor;
(iii) a computer content memory accessible by said processor and containing an electronic version of content to be printed;
(iv) a paper store provided with said printer and adapted to receive a plurality of sheets of pre-patterned paper pre-printed with said pattern;
(v) software accessible to said processor and runable on said processor adapted to cause said printer to print said electronic version of said content onto said pre-patterned paper from said paper store;
(vi) pattern-to-electronic memory location software accessible by said processor and runable on said processor;
said pattern-to-electronic memory location software being adapted to cause a digital pen-readable identity code to be printed upon sheets of digital paper when content is printed upon them, and to establish a concordance between the identity code printed on a sheet of pre-patterned paper and the content memory location of content printed on said sheet of paper.

Said pattern-to-electronic memory software, said computer memory, and said processor may be provided remote from, but networked to, said printer.

According to another aspect of the invention, there is provided a data set, or database, comprising an association of (i) computer memory addresses relating to content printed on a plurality of sheets of digital patterned paper having the same position-determining pattern printed upon them, and (ii) an identity-distinguishing code of each of said plurality of sheets, and each sheet having a sheet-differentiating identity-distinguishing code, each identity-distinguishing code being associated respectively with each of said plurality of sheets of digital patterned paper.

There may also be an association between digital pen-acquired pen stroke data representing digital pen movements on respective sheets of digital paper and the identity code or computer memory address corresponding to the particular sheet of digital paper, or area of the sheet of digital paper, from which the pen stroke data was acquired.

According to another aspect of the invention, there is provided a data set or database comprising an association of a computer memory addresses relating to content printed on a plurality of sheets of pre-patterned paper, pre-patterned with pen position-determining pattern, and a printer-read identity of particular respective regions of pattern space associated with each respective page upon which the content is printed.

According to another aspect of the invention, there is provided software which, when run on a computer processor having access to a computer memory containing electronic versions of human discernible content adapted to be printed by a digital printer upon pre-patterned digital paper, the pattern being adapted to enable a digital pen to acquire data to enable the position of the pen in the pattern to be established, is adapted to cause an association to be made between a computer memory address containing specific content printed upon a specific sheet of digital paper with an identity for that specific sheet of digital paper (e.g. a position in a digital pattern space);

and wherein said software is adapted to establish the identity of a page upon which specific content is printed and to cause said association to be made pursuant to instructions to print said content being received by said processor, and without requiring prior determination of the identity of the sheets of patterned paper and the order in which they will be presented for printing upon.

According to another aspect of the invention, there is provided a method of producing sheets of paper having both human readable content and pen-readable position-determining pattern printed on them comprising printing the pattern on said sheets of paper using a first printer capable of printing the pattern satisfactorily to create pre-patterned paper, transferring the pre-patterned paper to a second printer, and printing the content with the second digital printer, and also using the second digital printer to transfer identity data between the second digital printer and each sheet of paper, thereby causing there to be an association between an electronic digital version of the content printed on the pre-patterned paper and an identity of the sheet of paper upon which it is printed.

Said second printer may:

(i) have a pattern reader and read pattern on the sheets of paper to enable what content is printed on what pattern to be determined; and/or (ii) print distinct identity codes onto the pre-printed sheets thereby enabling a link between the content and the identity code to be established; and/or (iii) have an identity code reader and read a pre-printed distinct identity code on the sheets of paper to enable a link between the identity code and the content to be established.

According to another aspect of the invention, there is provided a method of combining pen strokes made upon a digital sheet having a pen position-determining pattern printed upon it and human discernible content printed upon it with an electronic version of said content held in a computer memory at a specific memory address, said method comprising using a digital pen to acquire pen stroke information relating to pen strokes made in the pattern, and also using said pen to acquire an identity code for said sheet, (usually, but not always distinct from the said pen position-determining pattern), and using pen-acquired identity code information to select an appropriate corresponding computer memory address so as to cause said pen stroke information to be interacted with said electronic version of said content.

The identity code itself may comprise a region of pattern, but a region separate from and non-contiguous in pattern space with said pen position-determining pattern.

According to another aspect of the invention there is provided a method of combining pen strokes made with a digital pen upon a digital sheet having pen position-determining pattern printed upon it and human-discernible content printed upon it comprising:

printing said sheet with said pattern in a pre-patterning operation to create a pre-patterned sheet;

subsequently printing said content onto said pre-patterned sheet using a content printer to create a content-printed digital sheet;

transferring an identity code between said content printer and said sheet to enable the identity of said sheet to be established in a subsequent pen-on-sheet writing operation, the transfer of said identity code occurring in the same time frame as printing said content onto said sheet;

associating in computer memory a link between said identity code and an electronic version of said content that was printed on said sheet;

using a digital pen to make pen strokes on said content-printed sheet;

conveying pen-acquired pen-position data, relating to the position of said pen in said pattern to a processor;

using the digital pen to acquire said identity code from said content-printed sheet;

the processor using the pen-acquired identity code, the pen acquired pen-position data, and the link between said identity code and said electronic version of said content to combine said pen strokes with said content.

This way of looking at the invention looks at a point in time when the user of a digital pen uses pre-patterned, content-printed, paper to modify/interact with an existing electronic document/content.

According to another aspect of the present invention, there is provided a method of using a plurality of sheets of digital paper with a digital pen to produce different distinct electronic documents comprising using a plurality of sheets of digital paper which each have the same position-determining pattern on them, and enabling the sheets to be distinguished from each other by printing an identifying pen-readable identity upon them at the time of printing human discernible content upon said sheets.

According to another aspect of the present invention, there is provided a method of using digital paper having a position determining pattern pre-printed upon it comprising using a printer to print both human discernible content upon the pre-patterned paper and to read one of: (i) the identity of the pattern of the paper upon which specific content is printed, and (ii) a page identity code carried by pages of said pre-patterned paper so as to link in computer memory the content with pattern position, or identity code.

According to another aspect of the present invention, there is provided a printer having a camera or sensor adapted to acquire information from one of the group:
(i) a position-determining pattern printed on paper upon which the printer prints;
(ii) an identifying code printed on paper upon which the printer prints.

A printer according to this aspect of the invention may have its firmware updated in order to control the camera or sensor to acquire said information. Alternatively firmware or software modifications may be made elsewhere in a network to which the printer is connected, for example in a computer (e.g. PC) to which it is attached, possibly the printer driver may be modified to achieve the desired functionality. Existing software in a printer or printer driver or computer may be upgraded or changed to provide the desired function: we may wish to provide and/or install upgrade software/firmware.

The printer may be arranged to print a document having document-type content and user-specific content, wherein said printer has input means arranged to selected one from the group of:
(i) document-type content; and
(ii) user-specific content,
and the other from the group of:
(i) document-type content; and
(ii) user-specific content
can be obtained from a predetermined association between information acquired from the camera or sensor and a digital electronic version of the associated content. This printer has the advantage that it can be used as a stand-alone device to print out pre-filled forms, and does not need to be connected to any computers, networks, servers or any other devices, in order to print forms. The user does not need to have access to a computer to print a pre-filled document. An input means, for example a button, touch-screen display or other suitable input means, is provided on the printer to allow for a document to be printed. Other advantages of printing documents having document-type content and user-specific content are discussed above.

The printer may have an electronic memory to store locally digital electronic versions of the content, so that the printer can print out pre-filled forms independently, without the need of an instructing PC, server, or any other networked device. The firmware of the printer may control access to the memory within the printer.

According to another aspect of the present invention, there is provided the use of a printer to print human discernible content onto a pre-patterned sheet of paper, pre-patterned with a position-determining pattern adapted to enable a digital pen to acquire data relating to the position of the pen in the pattern, and also to perform a linking act which is instrumental in linking (e.g. in computer memory) the identity of the sheet upon which specific content is printed and the address in computer memory at which electronic content, equivalent to said printed content, is stored.

Said linking act may comprise at least one of:
(i) said printer printing an identity code upon said sheet, said identity code being readable by a digital pen;
(ii) said printer having a pattern data acquirer and acquiring data from said pattern pre-printed upon said sheet of paper;
(iii) said printer having an identity code data acquirer and acquiring data from an identity code upon said sheet, said identity code also being readable by a digital pen.

According to another aspect of the present invention, there is provided a method of associating in computer memory a digital electronic version of printed human discernible content of a printed document with a position in a pen-readable pattern printed on said document, the method comprising:
using a plurality of pages of pre-patterned digital paper that have been pre-printed by a first printer with a position-determining pattern, said pattern being adapted to enable a digital pen to acquire information from said pattern to enable the position of said pen on said pattern to be determined;
printing said content on said digital paper using a different, content printer, said content printer using data from a digital electronic version of content to print said content onto said pre-patterned sheet as human discernible content, and wherein said first printer has substantially better print resolution than said content printer, and said content printer is not capable of printing said pattern satisfactorily;
using said content printer to be instrumental in associating in computer memory, at the time of printing said content onto said pre-patterned paper, a digital electronic version of said content with the pattern of the particular sheet of digital paper upon which said content is printed, said content printer acquiring data from the pre-printed pattern of said sheets, said content printer having a pattern reading device;
content printer-acquired pattern-related data enabling the identity of pattern on said sheet to be established, thereby enabling association of said digital electronic version and said position in said pattern to be made in computer memory.

The human-discernible content may comprise document-type content and user-specific content, wherein one from the group:
(i) document-type content; and
(ii) user-specific content can be selected by a user, and the other from said group:
(i) document-type content; and
(ii) user-specific content
can be obtained from a pre-determined association between said content printer-acquired pattern-related data and a digital electronic version of the associated content.

Advantages of printing documents having document-type content and user-specific content are discussed above.

According to another aspect of the present invention, there is provided a method of causing an association in computer memory between a digital electronic version of printed human discernible content of a printed document and an identity code printed on said document, the method comprising:
using a plurality of pages of pre-patterned digital paper that have been pre-printed by a first printer with a position-determining pattern, said pattern being adapted to enable a digital pen to acquire information from said pattern to enable the position of said pen on said pattern to be determined, and said pages of digital paper being in an undetermined sequence;
printing said content on said digital paper using a different, content printer;
using said content printer to be instrumental in associating in computer memory, at the time of printing said content onto said pre-patterned paper, a digital electronic version of said content with the identity code of the particular sheet of digital paper upon which said content is printed;
wherein said association comprises a step from the group:
(i) printing a plurality of different identity codes on a respective plurality of pre-patterned sheets each having the same pre-printed position-determining pattern, said identity codes being printed by said content printer as part of an operation of printing said content onto said respective sheets, said identity codes being capable of being used to distinguish data acquired by a digital pen from a said respective sheet of pre-patterned paper from data acquired by said pen from other sheets of pre-patterned paper having the same position-determining pattern;
(ii) acquiring data from said position-determining pattern or from an identity code pre-printed on said sheets using a printer which prints said content onto said pre-patterned paper, said printer having a pattern or identity code reading device, printer-acquired pattern or identity code-related data enabling the identity of said sheet to be established, thereby enabling said association to be made in computer memory.

According to another aspect of the present invention, there is provided apparatus adapted to associate printed digital pattern with equivalent digital documents comprising:
printing means arranged to print content corresponding to a digital document on a sheet of paper having pre-printed digital pattern;
scanning means arranged to scan a region of said pre-printed digital pattern as said content is being printed;
processing means arranged to process said scanned region of digital pattern and determine a location of said scanned region within a digital pattern space;
associating means arranged to associate said location of scanned region of digital pattern with said digital electronic version of content; and
storing means arranged to store said association in computer memory.

According to another aspect of the present invention, there is provided apparatus adapted to associate an identity code with equivalent digital documents comprising:
printing means arranged to print content corresponding to a digital document onto a sheet of paper having pre-printed digital pattern and arranged to print respective identity codes onto respective sheets of pre-patterned paper, and
processing means arranged to store in computer memory a relationship between content printed onto a specific sheet of paper and the identity code printed on said specific sheet of paper, and said processing means also being adapted to process data derived from said sheets of paper to determine the identity of a sheet of paper from said identity code and to determine the movement of a digital pen on patterned areas of said pre-printed pattern on said sheet, and to associate said identity code and digital-pen movement data from a specific sheet of paper with a specific electronic document corresponding to said identity code.

According to another aspect of the present invention, there is provided apparatus adapted to associate an identity code with equivalent digital documents comprising:
printing means arranged to print content corresponding to a digital document on a sheet of paper having pre-printed digital pattern; and a pre-printed identity code;
scanning means arranged to scan said pre-printed identity code as said content is being printed;
processing means arranged to process said scanned identity code and associate said identity code with said digital electronic version of content; and
storing means arranged to store said association in computer memory.

According to another aspect of the invention there is provided a printer provided with a camera or other scanner or sensor adapted to obtain data from sheets of paper in the printer to enable the identity of the sheets of paper to be established automatically by a computer, the printer having a processor and software adapted to cause said data obtained from said sheets to be conveyed out of said printer electronically for receipt by a linked external computer.

According to another aspect of the invention there is provided a sheet of paper having a position determining pattern printed over an area of a surface of the sheet;
said pattern comprising a pattern from which a digital pen can acquire data to enable the position of the pen in the pattern to be determined;
said area comprising an area from the group:
(i) all or substantially all of the area of a plan surface of the sheet;
(ii) a substantial area of a plan surface of the sheet;
wherein said area has delineated within it a pattern free region adapted to have printed upon it an identity code.

According to another aspect of the invention there is provided a method of generating an electronic record of a printed document, comprising the steps of:
printing an image on a sheet;
substantially during the printing step, printing on, or reading from the sheet identification data for identifying the printed image, the identification data being subsequently machine-readable from the printed sheet; and
storing the identification data and an electronic record of the image, mutually associated, in computer memory.

According to another aspect of the invention there is provided a method of associating in computer memory a digital electronic version of printed human-discernible content of a printed document with the identity of a sheet of paper having machine-readable pattern printed upon it, and upon which said content is printed, the method comprising transferring information defining an identity code for said sheet of paper between the sheet of paper and a printer at the time of printing the content onto the paper.

BRIEF DESCRIPTION OF THE DRAWINGS

Embodiments of the invention will now be described by way of example only, with reference to the accompanying drawings, of which.

DETAILED DESCRIPTION OF SOME EMBODIMENTS OF THE INVENTION

Figure 3:
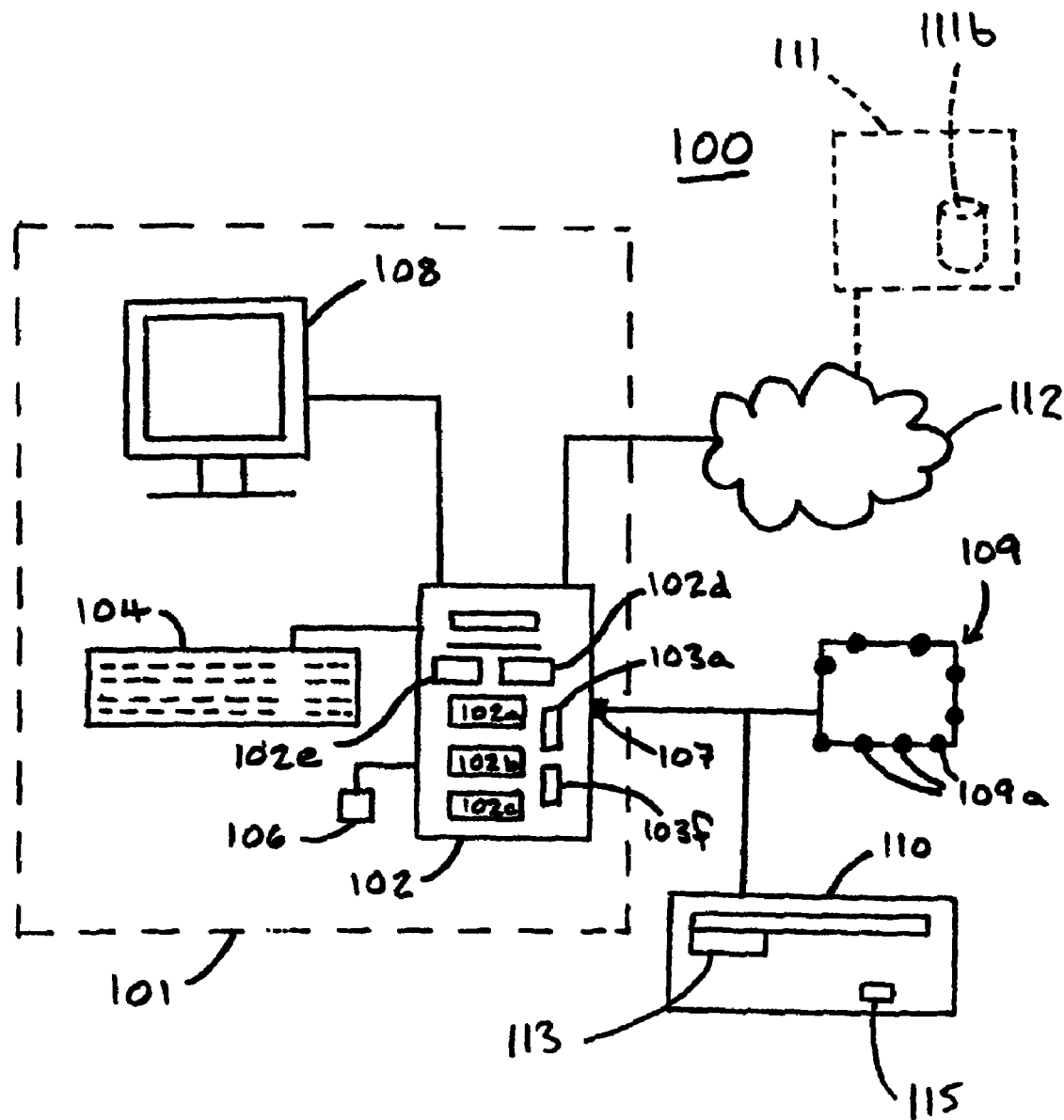
FIG. 3 shows schematically an embodiment of the invention in the form of a system for associating human readable content with an identity of a sheet of Anoto-type digital pattern on which the content is printed.

FIG. 3 is a schematic illustration of an embodiment of the invention comprising a system 100 for printing a document having content that is visible on a sheet of pre-printed Anoto digital paper, or Anoto-type patterned paper, which has pattern that absorbs light at non-visible wavelengths (e.g. at an infra-red wavelength). The dot pattern, or position-determining pattern, enables the position of the tip of a digital pen, such as pen 20, to be determined. The system 100 comprises a workstation 101 including a personal computer (PC) 102 which is connected to a local printer 110. The PC 102 may also be connected to the Internet 112. The workstation 102 includes a user interface including a screen 108, a keyboard 104 and a mouse 106. The PC 102 has a processor 102a, a memory 102b, and I/O software devices 102c by means of which the processor communicates with the screen 108, the keyboard 104 and the mouse 106, and a communications port 107 by means of which it communicates with the Internet 112 or a local network such as a LAN 109 having peripheral devices and/or other computers (e.g. PCs) 109a.

Figure 3A:
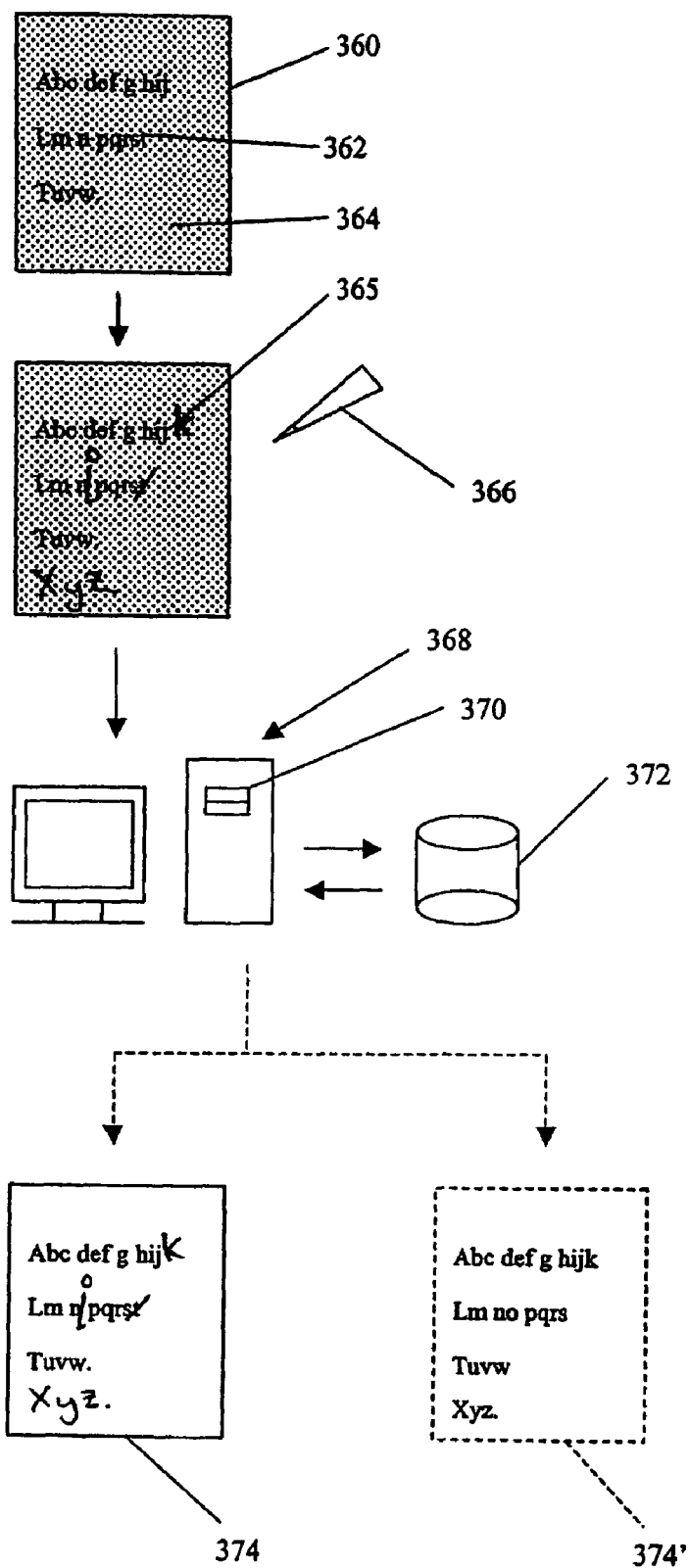
FIG. 3a shows schematically in an embodiment of the invention how a document created by some embodiments of the present invention can be edited by a digital pen.
Figure 3B:
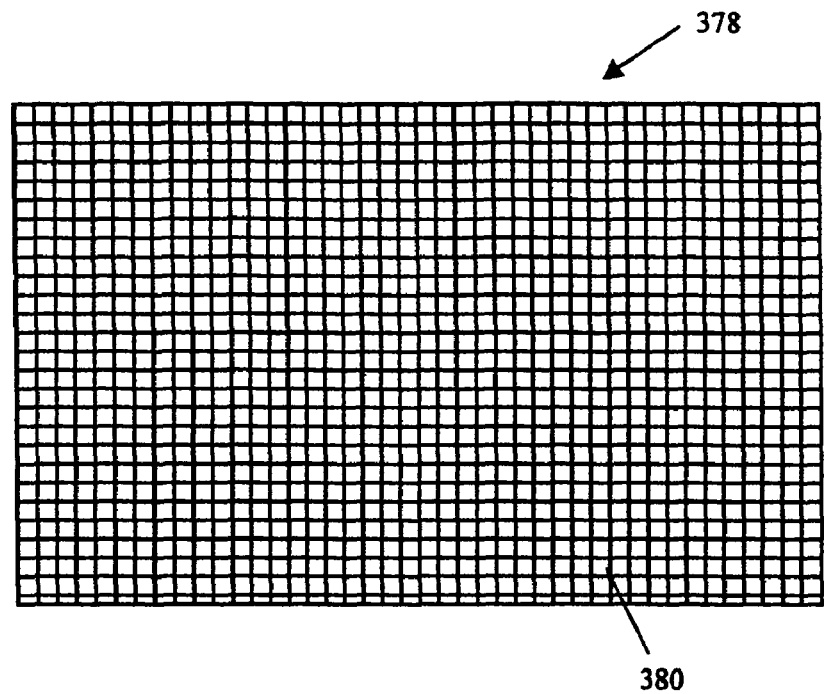
FIG. 3b shows schematically part of a pattern space segmented into individual pages and stored electronically in memory, which arrangement is prior art, but also used in embodiments of the invention.
Figure 3C:
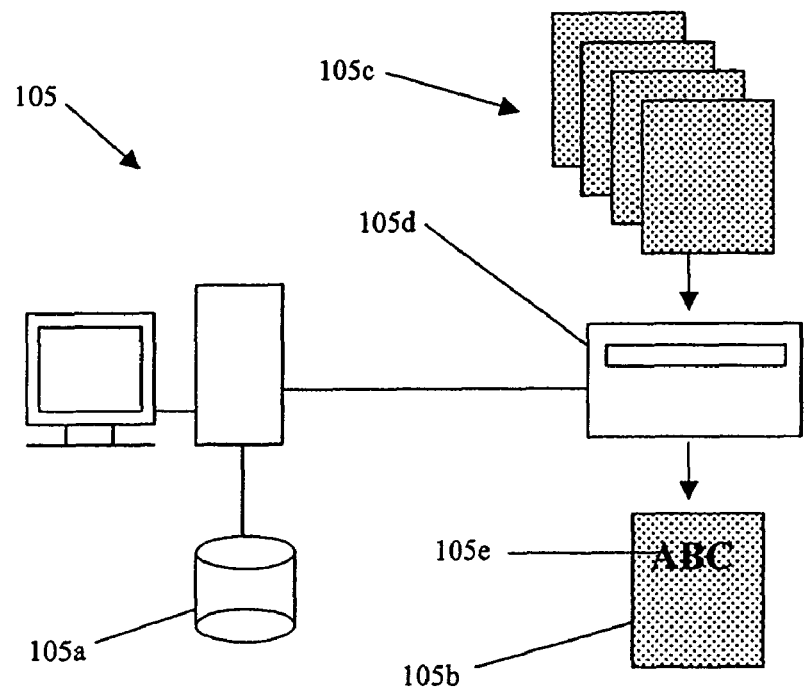
FIG. 3c shows schematically an embodiment of the invention in the form of a system for associating in computer memory a digital electronic version of content printed on a document with pattern printed on the document.

FIG. 3c shows a system 105 capable of performing a method of associating in computer memory 105a a digital electronic version of printed human discernible content 105e of a printed document 105b with a position in a pen-readable pattern printed on the document 105b. The method comprises using a plurality of pages of pre-patterned digital paper 105c that have been pre-printed with a position-determining pattern. The pattern is adapted to enable a digital pen to acquire information from the pattern to enable the position of the pen on the pattern to be determined. The method also comprises printing the content 105e on the digital paper 105c using a content printer 105d. The content printer 105d is instrumental in associating in computer memory 105a, at the time of printing the content 105e onto the pre-patterned paper 105c, a digital electronic version of the content with the pattern of the particular sheet 105b of digital paper upon which the content 105e is printed. The association does not essentially use a knowledge, prior to the print operation, of the order of the pages 105c prior to printing.

The printer 110 comprises a pattern scanner 113 arranged to scan a sheet of Anoto digital paper as it passes through the printer 110. The pattern scanner 113 can be located, for example, on the paper feeder of the printer 110, and the Anoto digital paper is scanned as it is fed into the printer 110. Alternatively, the pattern scanner 113 can be located on the paper outlet from the printer 110 and the Anoto digital paper is scanned as it leaves the printer 110. A further alternative is that the pattern scanner 113 is located within the housing of the printer 110. For example, the pattern scanner 113 may be located at the region of a printing head of the printer. As paper passes the pattern scanner 113, the Anoto-type dot pattern (referred to as "pattern") on the paper is scanned and analysed and a location of the region of scanned pattern within a pattern space can be determined.

The pattern scanner is usually, although perhaps not always, in fixed relationship with a print head or station (not shown) of the printer—so that the scanner-print head/station distance and configuration is fixed.

Figure 1:
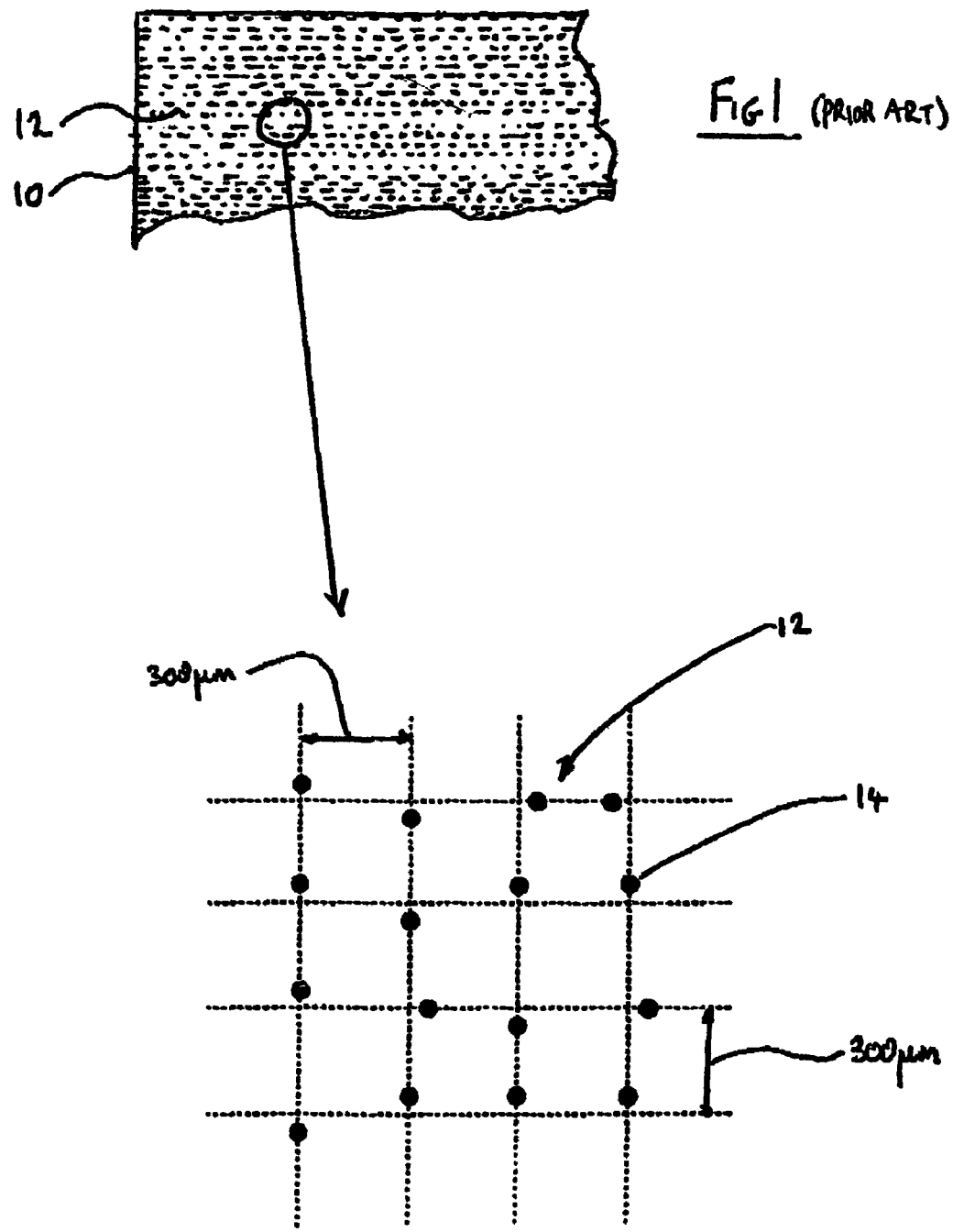
FIG. 1 shows schematically a prior art sheet of Anoto digital paper.

The pattern scanner 113 may be arranged to monitor the entire sheet of Anoto paper as it passes through the printer 110 in order to identify the pattern at some, many, or all, places on the sheet that pass next to the scanner 113. However, preferably, only a small portion of the paper is monitored, preferably before printing content starts (but the pattern could be read during printing of the content on the sheet, or after printing content onto the sheet). It is possible to identify the region of an area of pattern within a larger pattern space from only a very small sample of the pattern, as discussed with reference to FIG. 1.

In one embodiment, the association between the recognized region of pattern space and an electronic/digital version (e.g. a file) equivalent to the content (e.g. text and/or drawings) that has been printed on the paper is stored in the memory 102b of the PC 102. When the PC 102 then receives information from a digital pen, the local memory 102b within the PC 102 can be queried to retrieve the content that has been printed on the identified Anoto digital paper.

In an alternative embodiment, the firmware 115 within the printer 110 associates the identity of the recognized area of pattern with an electronic/digital version (e.g. a file, or other organised data set) equivalent to human discernible content (e.g. text and/or drawings) that has been printed on the paper and the association is stored locally in the firmware 115 of the printer.

An advantage to this embodiment of the invention is that it does not matter which way around the paper is fed into the printer. The association between the electronic version of the content and the region of digital pattern is made at the time of printing the content, and hence the association is based upon the actual orientation of the paper, and not on an assumption of the orientation of the paper. Also, if the paper were to feed into the printer at an angle, this could be accounted for as the pattern is scanned.

By reading the pattern using the printer we can obtain information about the registration/superposition of the content relative to the pattern, or indeed we can control where the content is printed relative to the pattern that is actually on the sheet of paper. If we know the position of the paper in the printer relative to the print head/station of the printer, and also the detailed position or accurate alignment/registration of the pattern relative to the print head/station, we can achieve a more accurate alignment/registration of the pattern relative to content in the digital model of the printed sheet. This can be useful to achieve ever more accurate representation of markings (e.g. digital pen applied markings, such as manuscript editing of text) relative to digital content that already exists in computer memory. Problems associated with, for example, a user editing a word in the physical, paper, world and the editing being represented in the digital, computer, world slightly misaligned, because the pattern on the paper and the printed content on the paper were not in exactly the expected alignment, can be reduced.

Figure 2:
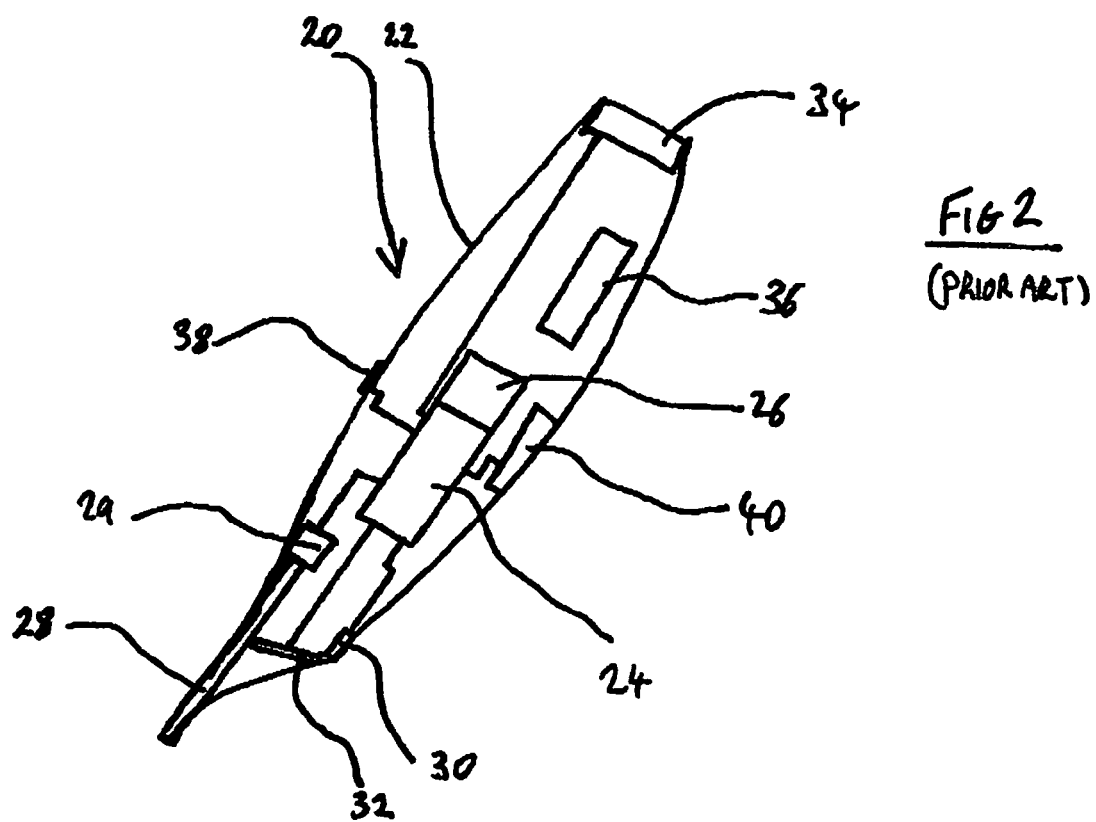
FIG. 2 shows schematically a known digital pen.

When the sheet of paper is subsequently edited using the digital pen shown in FIG. 2, information containing the region of pattern space that has been scanned when the page has been edited (amongst other things) is sent from the processor 24 in the digital pen to the PC 102. This information is used by the PC 102 to query the firmware 115 within the printer 110, to obtain a copy of the content that has been printed on the scanned region of pattern space. The PC 102 can then process the pen strokes with reference to the content that has been identified as being on the sheet.

Of course, if the content is stored in the PC then the PC will not need to query the printer. Another alternative is for the pen itself to store and/or process data such as the concordance between electronic document address (and possibly even the electronic document itself), the pen strokes, pattern space data etc.

The PC 102 can communicate with other PC's on the network 109, 112. If the PC 102 receives information from a digital pen that is editing a paper document that the PC 102 did not tell the printer 110 to print, then the PC 102 that receives the information from the digital pen will request an electronic copy of the digital file that has been printed as content on top of the identified pattern from whichever PC told the printer 110 to print the content. This has the advantage that a digital pen can be used with any PC 102 on the network 109, 112 to edit a paper copy of a digital document that has been printed by any other PC 102 on the network.

In a further embodiment, the association is stored centrally in memory 111b of a server 111, and any PC 102 in the network that receives information from a digital pen can query the server 111 over the network 112 for the content that has been printed on the identified sheet of digital paper, in order that the pen strokes can be processed correctly.

Processing the pen strokes can include correctly recognising a handwritten word and including it in the electronic version in the right place. Alternatively, or additionally, processing the pen strokes can include recognising a mark made in a box to trigger the execution of some application software, for example auto-sending an email.

Application software that is executed as a result of recognising a mark made in a box on digital paper can possibly be running on an application server, which may or may not be the same as server 111, and can operate on the inputs it receives from the user's PC. In some embodiments the digital pen can communicate directly with the application server itself. What application software is run and what output is produced, can depend on the position in the position determining dot pattern that the digital pen has marked.

References to "pattern" within this patent application refer to a pattern which can be read to determine the position of a region within a pattern space. In many, but not necessarily all, embodiments the pattern is a digital dot pattern that can be optically read by a pen. In other embodiments the pattern could be a series of protrusions and indentations that are read by a stylus, a varying magnetic field that can be monitored by a pen, an ultrasound signal, or any other arrangement that allows the position of a pen relative to a page to be determined. References to "content" can be interpreted as meaning any markings made on a page, including text, drawings, graphs etc, that are discernible to a human reader.

FIG. 3a shows schematically in an embodiment of the invention how a document created by some embodiments of the present invention can be edited by a digital pen. A paper document 360 having content 362 and a position determining digital pattern 364 is edited using a digital pen 366. The digital pen 366 is used to manuscript-amend the content 362 that has already been printed on the paper document 360. The digital pen 366 can also be used to add new content to the document 360. As the pen 366 is used to mark the page 360, it gathers data regarding the marks 365 that have been made on the page 360 and the position of the markings 365 in relation to the dot pattern 364.

The digital pen 366 sends the information it has gathered to the user's PC 368. A processor 370 within the user's PC 368 uses the information about the digital pattern 364 received from the digital pen 366 to identify the position in pattern space of the scanned region of pattern and hence on which sheet of digital paper the received pattern has been printed. The processor 370 within the user's PC 368 can then retrieve from memory 372 an electronic copy of the content 362 that has been printed over the digital pattern 364. The memory 372 can be located on a server connected to a network. Alternatively, the memory 372 could be located within the housing of the user's PC 368. The content does not have to have been printed using the memory 372: so long as the content is the same (for example, the same content could reside in more than one place on a network).

The processor 370 within the user's PC 368 then uses the information relating to the electronic document to determine where on the pattern the content is printed, and uses the information relating to the pen strokes to create an electronic version of the marked/edited physical paper document. The processor 370 can save the electronic document as a "What You See Is What You Get" (WYSIWYG) version 374 where the markings made by the user are stored electronically as the free-hand markings. Alternatively, the free-hand markings made by the user could be processed by the processor 370 and converted into typed text by Optical Character Recognition or Intelligent Character Recognition, and saved as a typed text electronic document 374'.

FIG. 3b shows schematically part of a pattern space 378 stored electronically in memory. This pattern space is basically the same as prior art pattern space. The dot pattern 378 can be stored on a server on the internet, or alternatively, a server on a metropolitan or local area network (MAN or LAN). The dot pattern 378 is split up into thousands of individual electronic pages 380, each page 380 having a different pattern. The individual pages 380 having the dot pattern are printed by a high-resolution printer (e.g. 600 dpi to 1200 dpi, or better). The physical pages with the dot pattern printed on them are fed into a low-resolution printer to have content printed over the top of the pattern.

Figure 4:
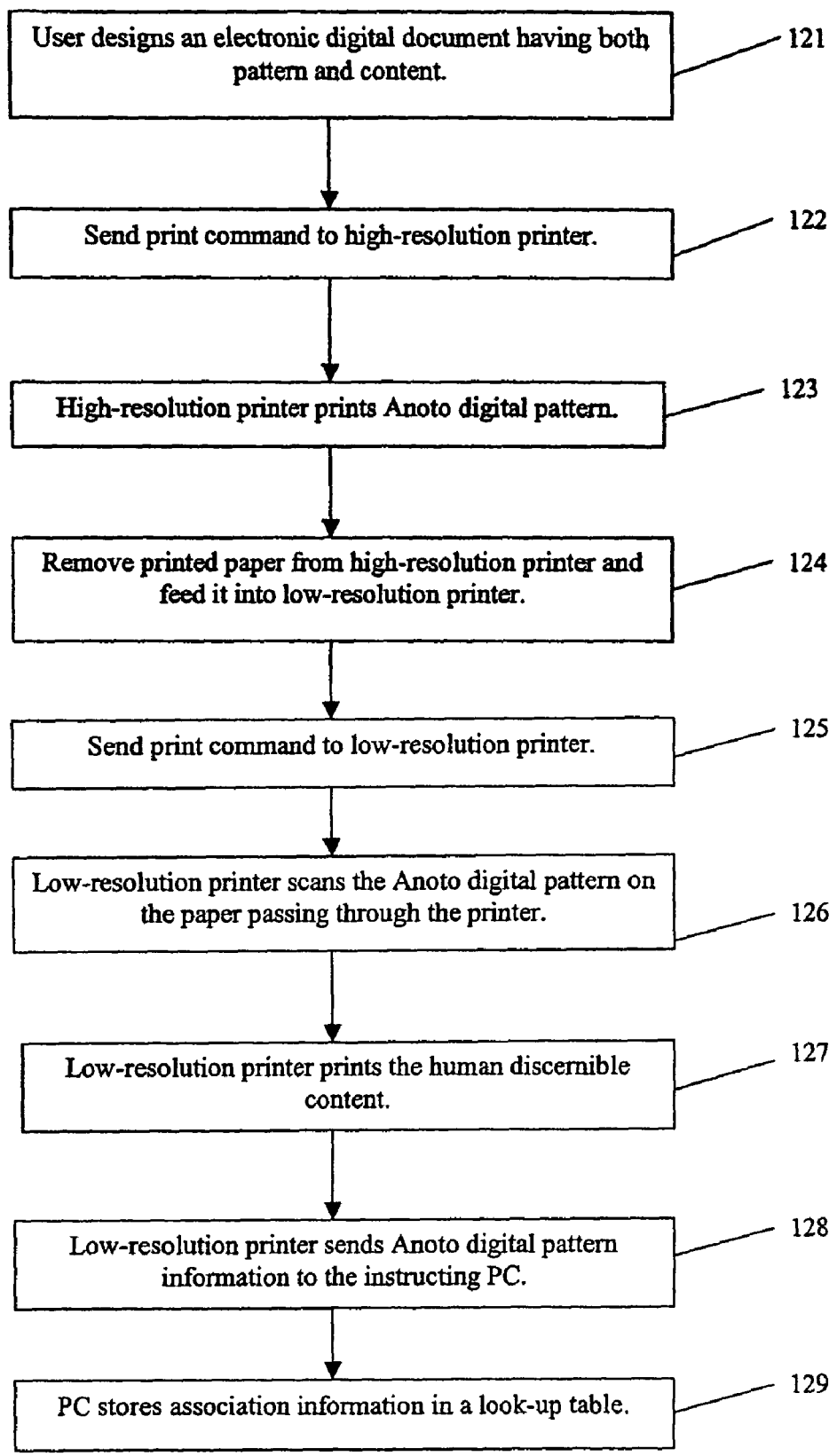
FIG. 4 is a flow diagram showing one embodiment of a method according to an aspect of the invention for printing a document having a position-determining digital pattern and human readable content, and associating the content with the identity of the position-determining digital pattern as the document is printed.

FIG. 4 is a flow diagram showing one embodiment of a method of printing out a document having both a position-determining Anoto-type digital pattern and a human readable or discernible content by a user on a network. At step 121, a print command is sent from the PC to a high-resolution printer. This causes the high-resolution printer to print out sheets of paper having the required Anoto digital pattern at step 122. In some embodiments many sheets of paper are printed, each sheet of paper having a different region of the position determining pattern. Perhaps of the order of a hundred, or a thousand, or more, sheets of paper having position determining pattern are printed. In some examples they are printed on a digital printer. In other examples they may be printed using other types of printer, for example an offset printer. At step 123, a high-resolution printer has finished printing the Anoto digital pattern, and the user removes the printed sheet/s, and feeds them into a low-resolution printer.

At step 124, a user wants to create and print a paper document having human discernible content and machine discernible position determining dot pattern. The user creates an electronic file having the desired content, or alternatively, the user selects an existing electronic file having the desired content, for example on a PC connected to the network. A print command is then sent from the user's PC to a low-resolution printer at step 125. The low resolution printer scans the pattern and obtains a position, such as a Cartesian co-ordinate, for the position of the scanned region of dot pattern within the page, within the entire dot pattern, at step 126. The low-resolution printer (e.g. 75 or 150 dpi) then prints the content over the top of the dot pattern at step 127.

It will be appreciated that in other embodiments the low resolution printer may print the content before the pattern is scanned, and in further embodiments still the pattern may be scanned whilst the content is being printed.

At step 128, the low-resolution printer sends a position-determining signal, such as a co-ordinate of the part of the pattern (a small area, perhaps 1 $mm^2$ or less) to the instructing PC. A processor within the PC uses a pattern space stored electronically in memory to determine on which individual page the scanned region of dot pattern exists. The PC then stores an association between the location in memory of the content being printed on the low-resolution printer with the memory location of the recognized region of pattern space, in a look-up table in memory at step 129.

As will be appreciated, in the above example, the printer scans a small area of the pattern, and from this small area it determines the position of the scanned area within pattern space. This position is then sent to the PC. In other embodiments, the printer may scan a small area of pattern and send information relating to the scanned dots to the instructing PC, and the PC determines the position of the scanned area within pattern space. In further embodiments, the PC may pass on the information relating to the scanned dots to a server, which determines the position within pattern space.

Figure 4A:
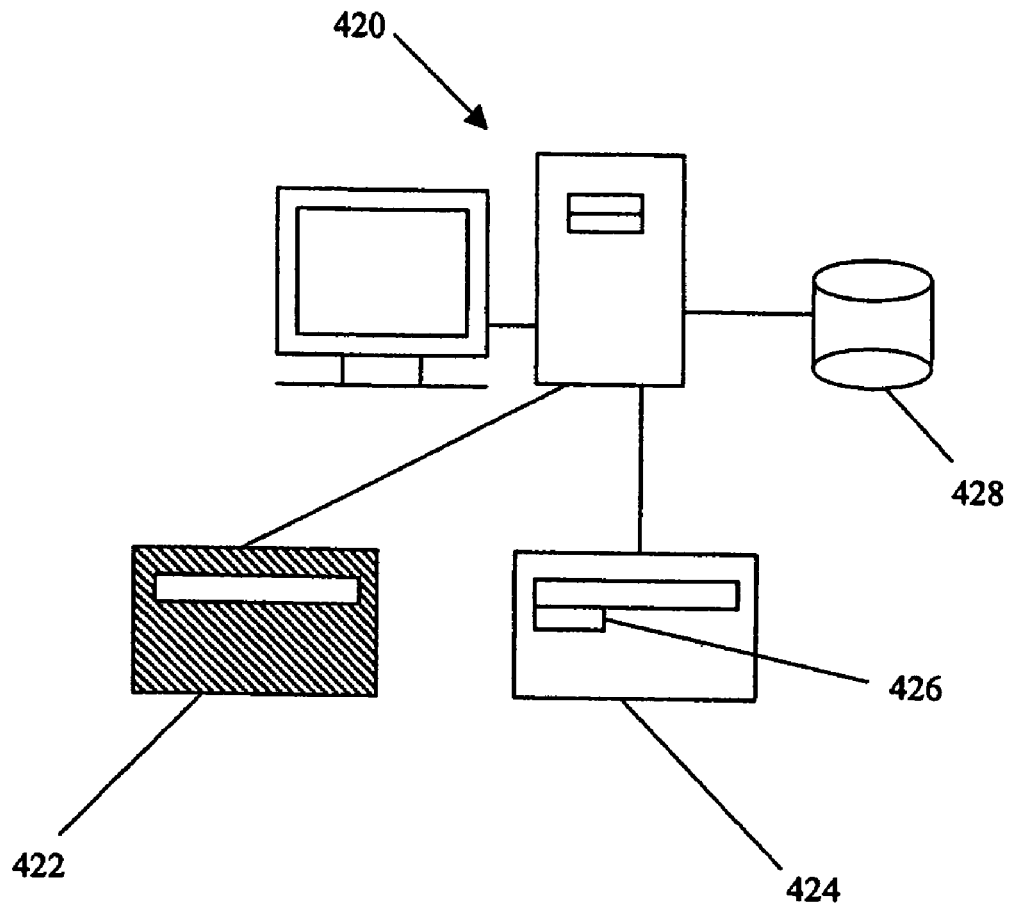
FIG. 4a shows schematically an embodiment of an aspect of the invention in the form of a system that can be used to implement the method of FIG. 4.

FIG. 4a shows schematically an embodiment of a system that can be used to implement the method of FIG. 4. A PC 420 is connected to a high-resolution laser printer 422 (resolution 1200 dpi), a low-resolution inkjet printer 424 (resolution 600 dpi or less), and has access to memory 428. The laser printer 422 is used to print out many sheets of position determining digital paper, and the paper is then fed into the inkjet printer 424. When it is desired to print content over the top of the digital pattern, the PC 420 sends a print command to the inkjet printer 424 and the next available sheet of paper having digital pattern is used. While the content is being printed, a pattern scanner 426 attached to the inkjet printer 424 scans the digital pattern and transmits the scanned data to the PC 420. The PC 420 then stores an association between the scanned dot pattern and the printed content in memory 428.

In alternative embodiments the digital pattern may be scanned before or after the content is printed.

Figure 4B:
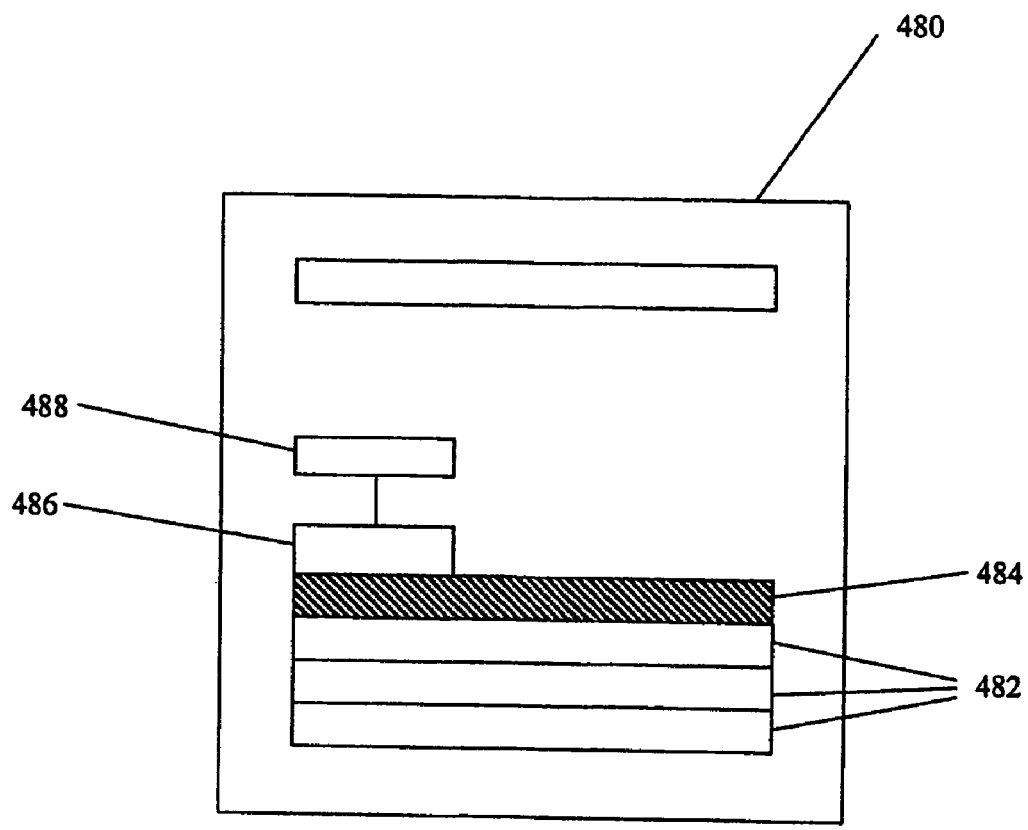
FIG. 4b shows schematically an embodiment of the invention, in the form of a low-resolution printer that can be used to print human discernible content on pre-printed position determinable digital paper.

FIG. 4b shows schematically an embodiment of a low-resolution printer that can be used to print human discernible content on pre-printed position determinable digital paper. The printer 480, has a plurality of paper trays, at least one of which is loaded with patterned paper. In this example, the printer has four paper trays 482, 484 that can be loaded with different types of paper. In this example three trays 482 are loaded with plain paper, and one tray 484 is loaded with paper having pre-printed position determining digital pattern. In other arrangements any number of the trays 482, 484 could be loaded with digital paper, depending on the demand for certain types of documents. A pattern scanner 486 is located adjacent the tray 484 having the digital paper, the scanner 486 being adapted to scan a region of the patterned paper as it is fed into the printer. The pattern scanner 486 is in communication with a processor 488 that can transmit the scanned pattern information to an off-printer processor.

This embodiment has the advantage that a user can use the low-resolution printer 480 to print documents having position determining digital pattern and documents without digital pattern, without having to get up, walk to the printer, and change the paper that is fed into the printer 480: appropriate paper is taken from the appropriate paper tray depending upon whether the print command expects there to be patterned paper used or not.

Figure 5:
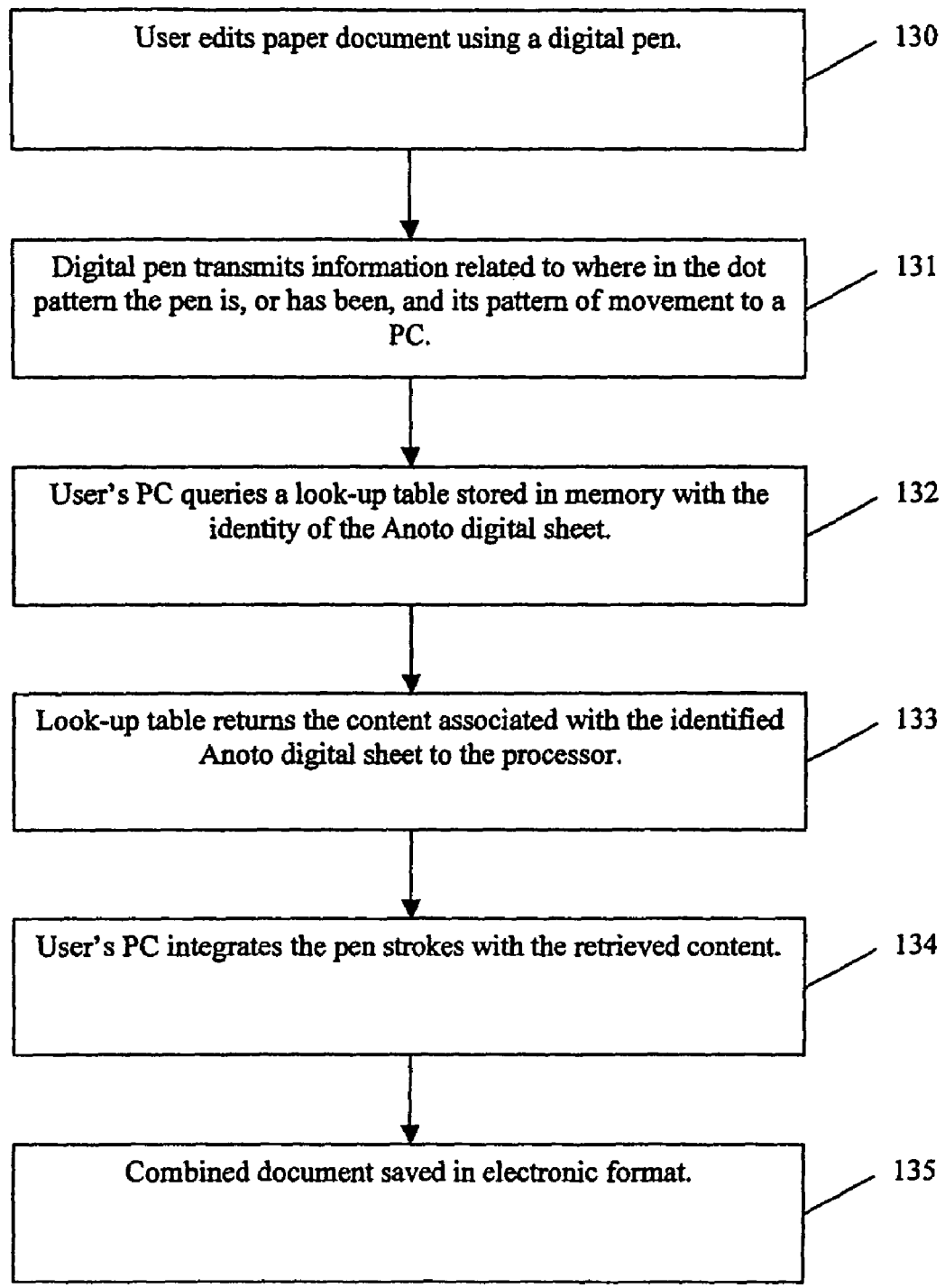
FIG. 5 is a flow diagram of a prior art method of editing a document, also used in some embodiments of the present invention, the document having been produced by the new method of FIG. 4.

FIG. 5 is a flow diagram showing one embodiment of a method of editing a document created according to the method of FIG. 4. At step 130, a user uses his digital pen to amend a sheet of paper that has been created by the method of FIG. 4.

At step 131, the digital pen transmits to the processor in the PC information related to where in the dot pattern the pen is, or has been, and its pattern of movement. The processor within the PC can then look in memory to identify the area of Anoto, or Anoto-type, digital paper that has the pen-read portion of pattern on it. The processor then can use the look-up table stored in the memory of the PC to identify the memory location of the digital file relating to the content that has been printed at that identified position in pattern space. The processor then accesses the file having the content that has been printed at the identified position at step 133.

At step 134, the user's PC, having knowledge of the human discernible content that has been printed on the page being edited by the digital pen, and a knowledge of the human-applied pen strokes, can integrate the pen strokes made by the user with the content that has been pre-printed on the page. At step 135, the user's PC saves the integrated document in electronic format, with the pen strokes and pre-printed human discernible content combined.

In some embodiments the digital file stored in memory relating to the human discernible content that was printed on top of the pattern is overwritten with the integrated document. This will mean that any subsequent pen strokes made on the paper document with a digital pen will cause the look-up table to identify, and the processor to modify, the integrated document. A first batch of pen strokes will therefore not be lost when a second batch of pen strokes is made on the same page.

Figure 6:
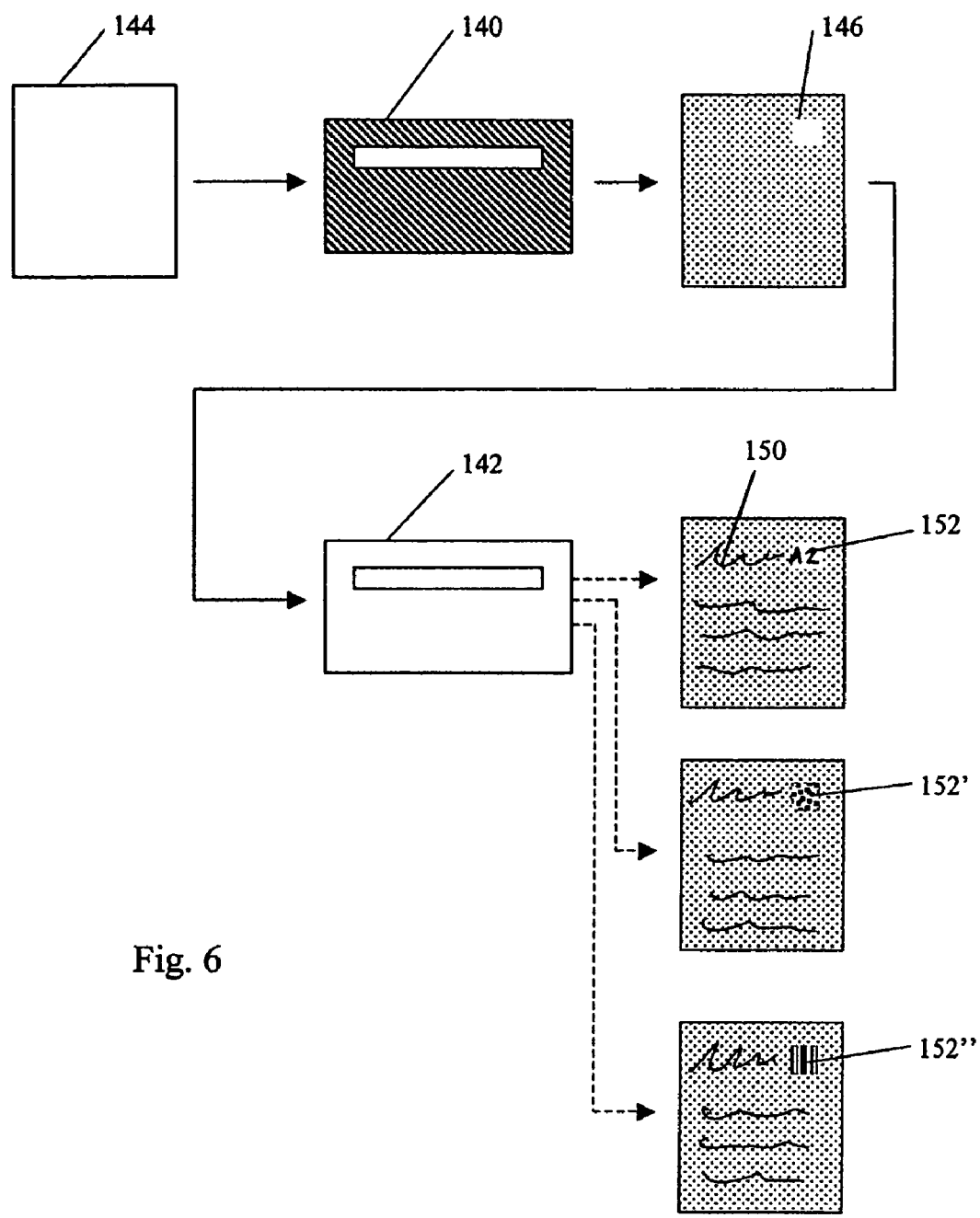
FIG. 6 shows schematically another embodiment of the invention comprising a system for printing a document having Anoto-type digital pattern and human readable content, and shows schematically how an association between the Anoto-type digital pattern and human readable content can be recorded.

FIG. 6 shows schematically an alternative technique of printing a document having digital pattern and human readable content, and storing an association between the digital pattern and the human readable content. In this example a high-resolution printer 140 is used to print a sheet of paper with a digital pattern, and a low-resolution printer 142 is then used to give an identity to the sheet of paper having digital content at the same time as printing the content (or in the same time frame as printing the content).

A blank sheet of paper 144 is fed into the high-resolution printer 140, and a print command is sent to the high-resolution printer 140 from a PC (not shown in the Figure) to print Anoto-type digital pattern on the sheet. An area of the sheet is not printed with Anoto-type pattern and is left blank; this area is called a digital stamp box 146. The digital stamp box may represent a small proportion of the total area of the page. The digital stamp box may represent 5% of the total area of the page, or less (or more). In other embodiments, the entire sheet, or nearly the entire sheet, of paper may be printed with Anoto-type digital pattern, and a portion of the pattern will be overprinted with a low-resolution unique identifier. The sheet of paper is then fed into a low-resolution printer 142, and a print command is sent from a PC to the low-resolution printer to print content 150 over the top of the Anoto-type pattern. The PC that sends the print command to the low-resolution 142 printer does not necessarily have to be the same PC that sent the print command to the high-resolution printer 140. The second print command also instructs the low-resolution printer 142 to print a unique identifier 152,152', 152" in the digital stamp box 146 left blank by the high-resolution printer 140.

The low resolution unique identifier may be a machine readable alphanumeric character or character string 152, a machine readable dot pattern 152', a bar code 152", or any other form of identification that can be recognised by an appropriate sensor/reader. A machine readable dot pattern 152' may be a different pattern to the Anoto-type digital pattern that is printed on other regions of the sheet, or from a different region in the dot pattern space to the part of the dot pattern used to determine the position and movement of the pen. (By dot pattern no limitation to dots as such is intended: strokes, lines, markings may be alternatives: but Annoto-like dots are currently preferred).

A correlation between the low-resolution unique identifier 152,152', 152" and the electronic equivalent to the content 150 printed on the sheet is then recorded and stored in the memory of the PC. In use, a user will read the identifier 152, 152', 152", for example with their digital pen, when adding content to the sheet (e.g. with their digital pen). Thus, in one scenario, a user ticks an identifier (e.g. a box) on a sheet of patterned paper with their digital pen to establish the identity of the page. In another, a printer reads the identifier of the sheet at some stage in printing content on the sheet.

This embodiment has the advantage that a plurality of sheets of paper having the same Anoto-type digital pattern can be used with different unique identifiers. Their unique low-resolution identifiers can differentiate sheets having the same digital pattern. This can greatly reduce the cost of having to purchase many different sheets of Anoto digital paper, sheets with the same pattern coding for the same space in pattern space can be distinguished from each other as there are unique identifiers added to each sheet.

In some embodiments the low-resolution printer 142 has machine discernible ink for printing the unique identifier 152, 152', 152" and human discernible ink for printing the content 150. The machine discernible ink may be the same ink that is used in the high-resolution printer 140 to print the Anoto-type pattern, and this enables the same camera within the digital pen to read the unique identifier 152, 152', 152" and the Anoto-type pattern.

Alternatively, different machine discernible ink can be used to print the unique identifier 152, 152', 152" to ensure that there is no confusion between the Anoto-type digital pattern and the unique identifier 152, 152', 152". When different machine discernible ink is used to print the unique identifier 152, 152', 152", two cameras may be required within the digital pen (or within a printer in other embodiments). Alternatively, the digital pen has one camera and there are two pieces of software stored on a processor (either on-pen or off-pen), one piece of software for each type of machine discernible ink. An advantage to this arrangement is that it is not necessary to have a blank digital stamp box 146 in the Anoto digital pattern, as the digital pen will see the two machine discernible inks independently.

Other ways of overlaying the identity code onto pattern may be employed (e.g. using a bar code), there being bar code reading software provided in at least one of the pen, or an off-pen server/processor.

In further embodiments still, the unique identifier 152, 152',152" can be printed over the top of the Anoto digital pattern with the same machine discernible ink. Software on a processor, when scanning the unique identifier, can process the scanned image to separate the digital pattern from the unique identifier. The processing can include filtering the image. For example, the processor can apply a Fourier Transform to the image to remove the small dots of the Anoto pattern and leave big dots of an alternative pattern that is used as the unique identifier. The scanned image is only filtered when the user reads the unique identifier, and not when the content of the document is being edited/marked. The processor used to filter the image can be located on a PC, on the server, or in the pen itself.

The low-resolution unique identifier can be any one of: a textual identifier 152 recognizable by optical character recognition; an alternative dot pattern 152' that does not require the same high degree of resolution as the Anoto dot pattern; a barcode 152"; or any other arrangement that can identify the sheet of paper.

The low-resolution unique identifier is preferably recognized by the same digital pen that is used to read the dot pattern. Alternatively, a different piece of apparatus is used to scan the low-resolution mark, for example a barcode reader.

Figure 6A:
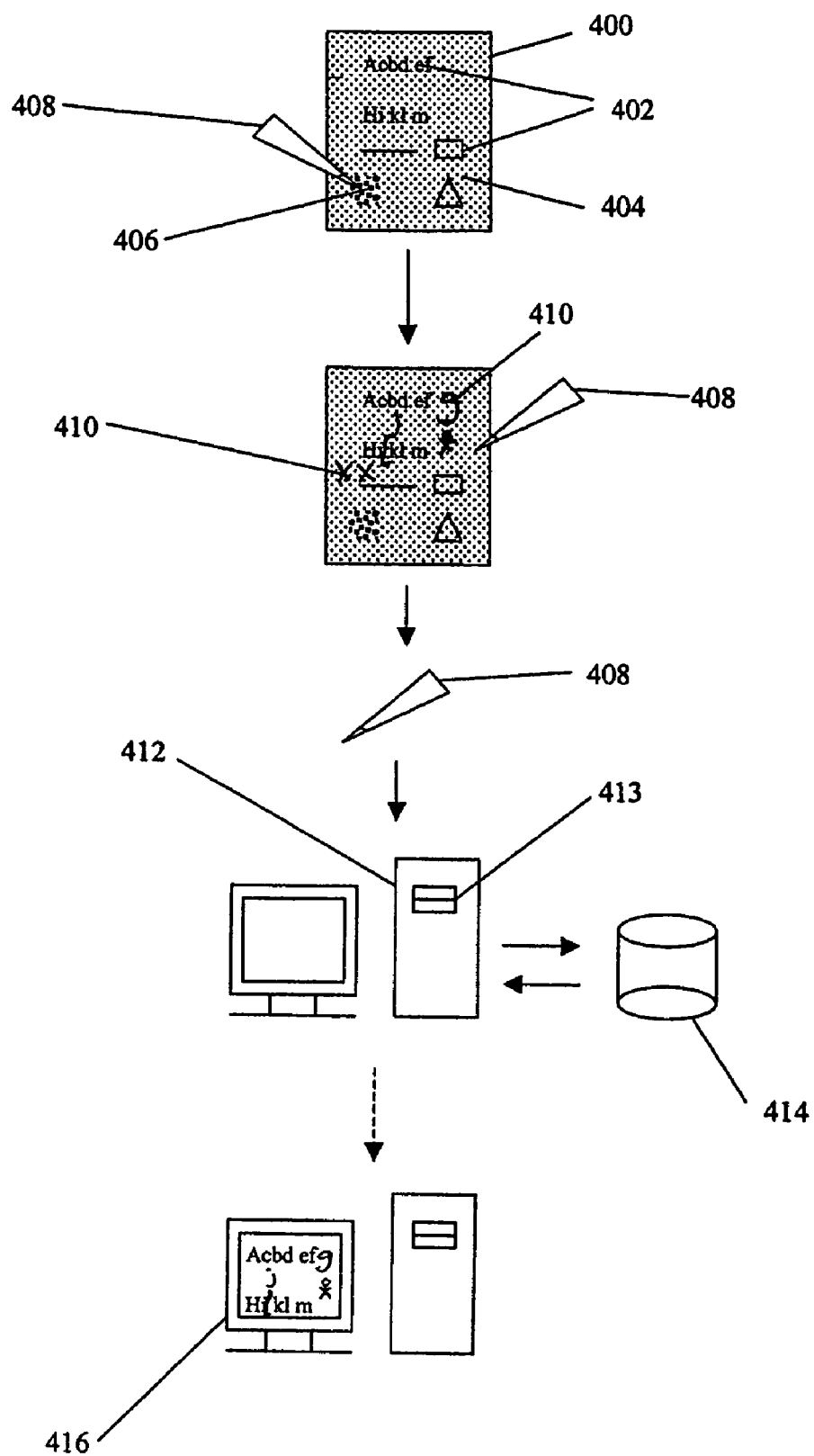
FIG. 6a shows schematically how a document created by some embodiments of the invention can be edited by a user.

FIG. 6a shows schematically how a document created by some embodiments of the invention can be edited by a user. A paper document 400 has human discernible content 402, a position determining dot pattern 404, and an area with a unique low-resolution identifier 406. In this embodiment, the unique identifier 406 is scanned by a digital pen 408, before the content of the paper document is edited (but it could be read by the pen during or after editing).

Free-hand markings 410 are made on the document 400 using the digital pen 408. In alternative embodiments the content of the document is edited before the unique identifier is scanned.

Once the unique identifier 406 has been scanned and the paper document 400 has been edited, the digital pen transmits the unique identity and information relating to the pen markings made within the frame of the pattern to the user's PC 412. A processor 413 within the PC 412 retrieves the electronic document from memory 414 corresponding to the content 402 that has been printed on the paper document 400. The processor 413 then overlays the pen markings with the electronic content 402, or interacts the pen markings in accordance with an application server. The results can optionally be displayed to a user on a monitor 416.

Figure 7:
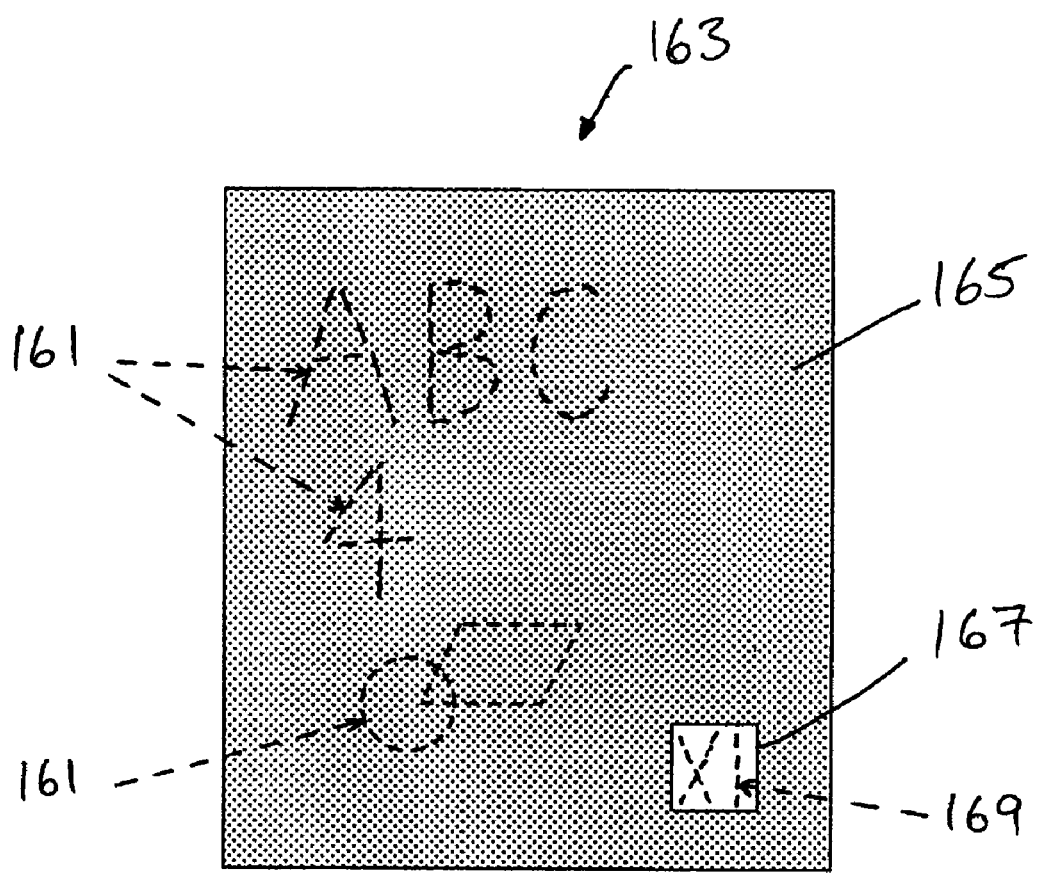
FIG. 7 shows an embodiment of the invention comprising a document with pre-printed pattern that can be used with some embodiments of the present invention.

FIG. 7 shows a document 163 with pre-printed pattern 165. An area 167 of the document 163 is not pre-printed with pattern 165 to provide a space for a unique identifier to be printed in the blank area 167. An example of content 161 and a unique identifier 169 is shown in FIG. 7 in dotted lines. The content 161 is printed in human-discernible ink, and during the same print job, the unique identifier 169 is printed in machine discernible ink. The content 161 and unique identifier 169 are printed by a low-resolution printer.

Figure 7A:
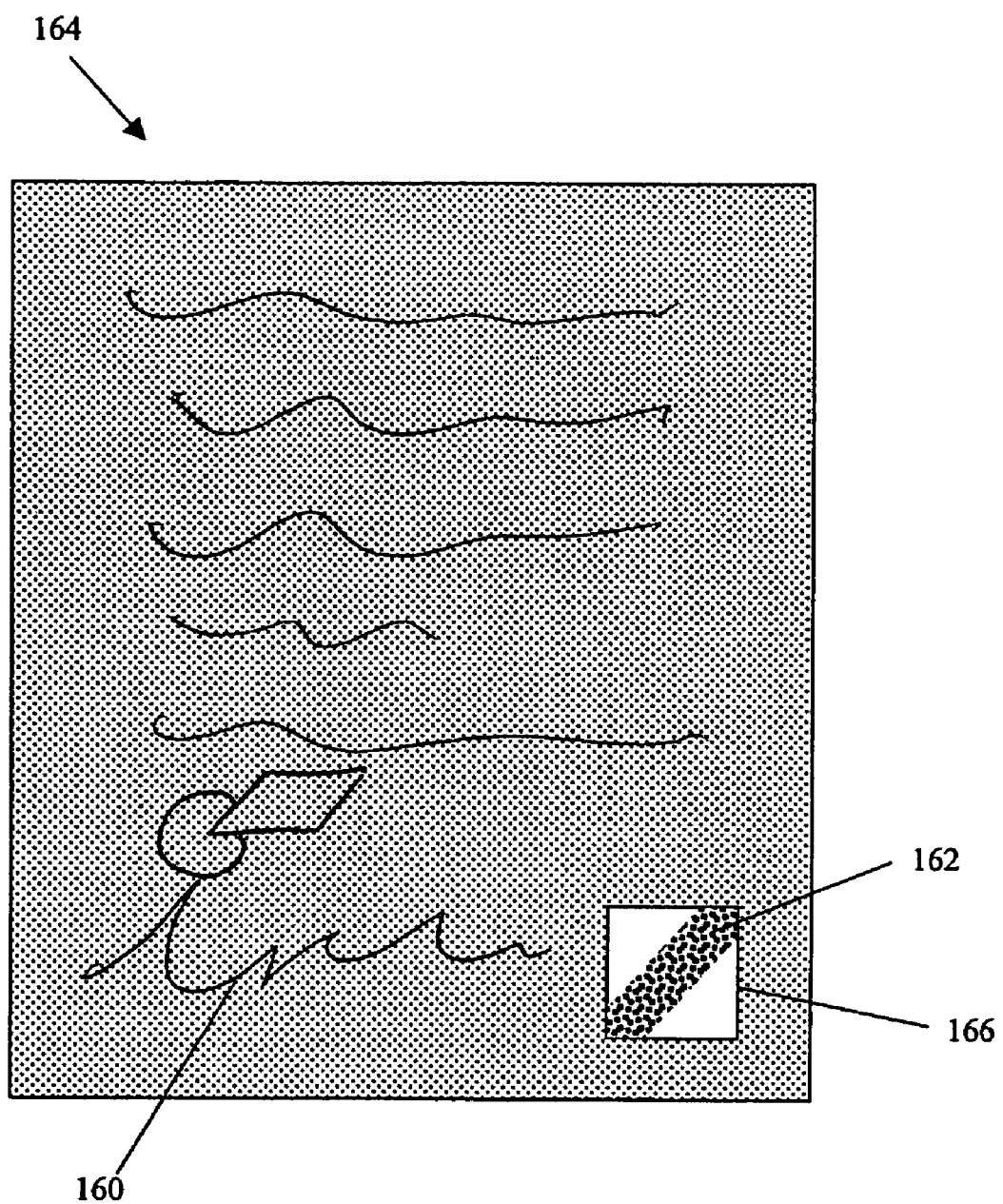
FIG. 7a shows schematically a document according to an aspect of the invention, the document having a layout for directing a user to a unique identifier located on the document.

FIG. 7a shows a document 164 having a layout for directing a user to a low-resolution unique identifier 162 located on the document. This has the advantage that a reduced amount of space is required for the unique identifier 162, and less unique identifier (e.g. dot pattern) is used, and less usable space on the page is wasted. In this embodiment an instruction 160 is printed in human discernible ink, instructing the user to move the digital pen along a predefined path, which will ensure that the digital pen scans the unique identifier 162. In this example the instruction 160 reads: "Before editing the document please tick the box". The unique identifier 162 is located along a diagonal of the digital stamp box 166 ensuring that the user will pass the digital pen over the unique identifier 162 as he ticks the box 166. A pen guide/constraint mechanism is in place so that a well-conditioned set of dots will be travelled over by the pen. This can minimise the number of dots needed to identify the page, and require less pattern.

Figure 8:
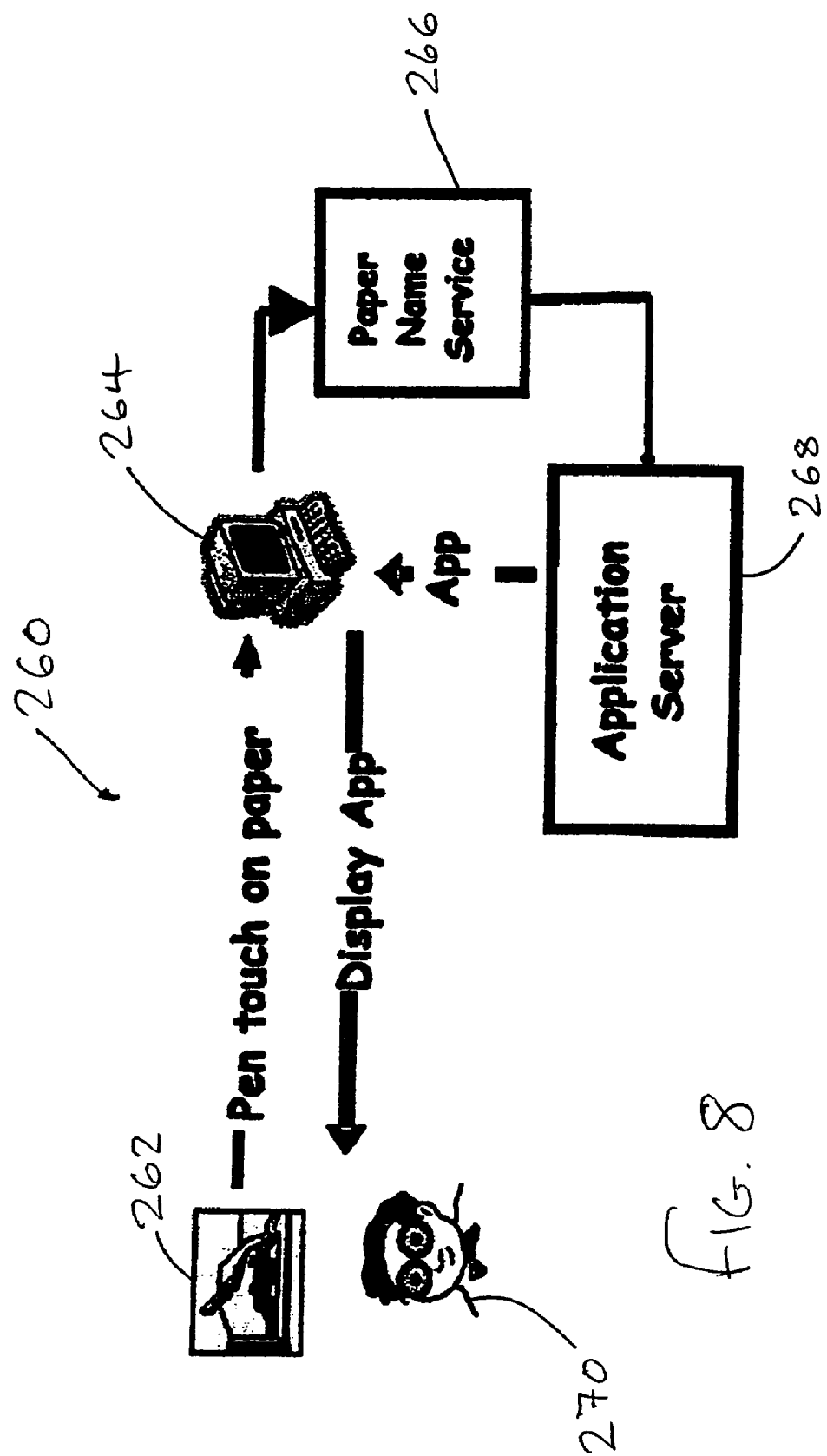
FIG. 8 shows schematically another embodiment of the invention, in the form of a system for processing a document created according to an aspect of the present invention.

FIG. 8 shows an alternative embodiment of a system according to the present invention for processing a digital page. This system 260 is used for running applications associated with a page when a digital stamp box is ticked/marked.

The user 270 uses a digital pen 262 to extract the unique identifier from the digital stamp box and to make strokes on the paper.

This information is then sent to the user's computer 264. The user's computer 264 sends the information received from the digital pen to a Paper Name Service 266 (e.g. a server). The Paper Name Service 266 identifies the application server 268 associated with the unique identifier, and the data is then sent to the application site/server. The system looks up the application associated with the content and applies that application to the pen strokes recorded prior to ticking/marking the Digital Stamp Box. The effect of running the application can then be displayed to the user 270.

Figure 8A:
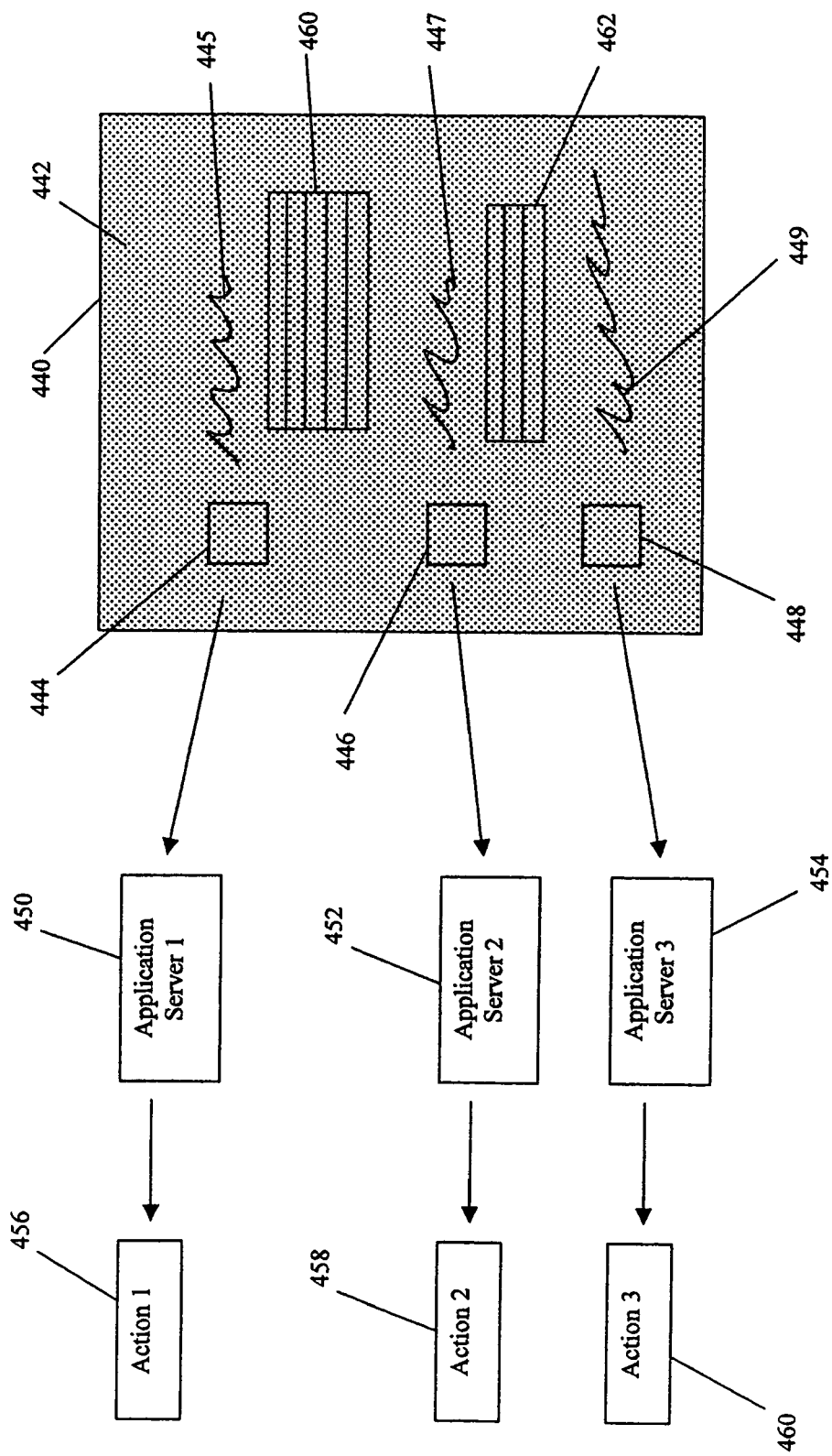
FIG. 8a shows schematically a paper document, produced by an aspect of the invention, that can be marked in order to cause application servers to perform an action.

FIG. 8a shows schematically a paper document 440 having position determining digital pattern 442. The document has three tick boxes 444, 446, 448. Marking a tick box 444, 446, 448 with a digital pen can cause a pre-determined action 456, 458, 460 to be performed by an application server 450, 452, 454. Each tick box 444, 446, 448 has an instruction 445, 447, 449 for a user printed in human discernible ink associated with it.

Three examples of possible instructions and their associated application will now be discussed.

Instruction 445 reads "Tick here to send an email, and enter the intended recipient and the text of the email in the box below". When a digital pen is used to tick the box 444 and to write in the text box 460, information relating to the pen strokes and the position within the dot pattern over which the pen has passed is transmitted to a PC. The PC then uses a Paper Name Service which is often a separate entity on a network or on the World Wide Web, to determine which sheet of paper has the received portion of pattern on it, and what content has been printed on that sheet. In this case the Paper Name Service determines that the portion of pattern within the tick box 444 has been scanned by the digital pen, and that all markings made by the digital pen within the text box 460 should be transmitted to an Application Server 450. The Application Server 450 uses Optical Character Recognition or Intelligent Character Recognition to convert the handwriting within the box 460 into text, and to pick out the email address of the intended recipient. The Application Server then sends the recognised text as an email to the intended recipient.

Instruction 447 reads "Tick here to send flowers, and enter the recipients name and address and your personal message in the text box below". When this tick box 446 is scanned, the Paper Name Service causes an Application Server 452 to instruct a florist to send flowers to the intended recipient. The personal message is printed out in the as-written handwriting and attached to the flowers to make the message more personal.

Instruction 448 reads "Tick here to receive a bill". In some embodiments, the digital paper will be specific to a user, and the Application Server 454 will have access to the personal details of the owner of the sheet of paper. The Application Server 454 may also have access to Application Server 452 (or any other Application Server) to obtain details of what services the user should be billed for. In other embodiments the user will have to write his personal details on the digital sheet in order to receive the bill.

Figure 9:
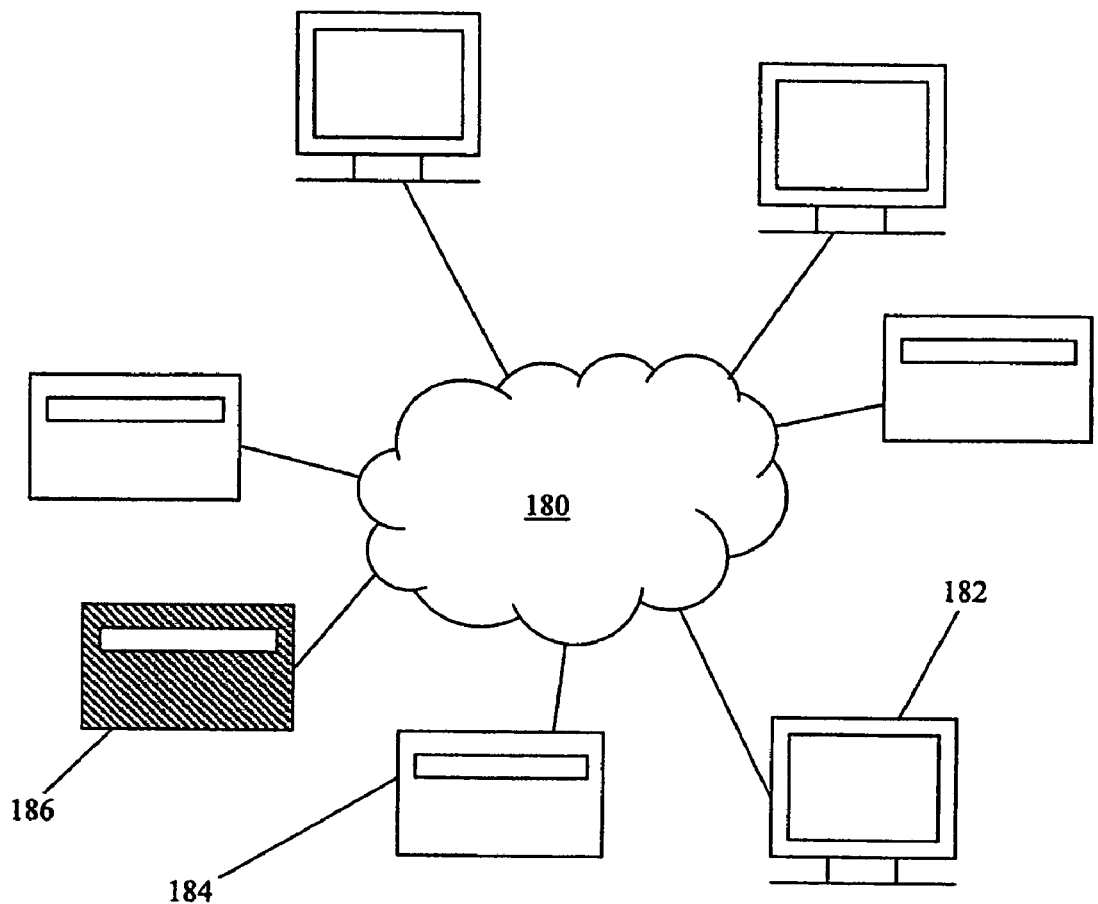
FIG. 9 shows a network according to some embodiments of the present invention.

FIG. 9 shows a network according to some embodiments of the present invention suitable for use in an office environment. The network consists of three user terminals 182, three low-resolution inkjet printers 184 and one high-resolution laser printer 186. The high-resolution laser printer 186 is used to print a high-resolution machine discernible Anoto dot pattern on sheets of paper that can be subsequently used with any one of the low-resolution inkjet printers 184 to print human discernible content. In this example, one thousand sheets of paper are printed with dot pattern by the high-resolution printer, and taken from the high-resolution printer and distributed evenly between the paper trays of the low-resolution printers. The low-resolution inkjet printers are arranged according to an embodiment of the invention to associate an electronic copy of the content printed on the sheet with the position in pattern space/identity of the sheet at the time of printing the content. A user can print content using their own, or another, low-resolution printer. They do not need to have access to a high-resolution printer themselves. It is an advantage to have fewer high-resolution printers that are usable with a higher number of low-resolution (e.g. inkjet) printers, as low-resolution (e.g. inkjet) printers generally cost less than high-resolution (e.g. laser) printers.

Figure 10:
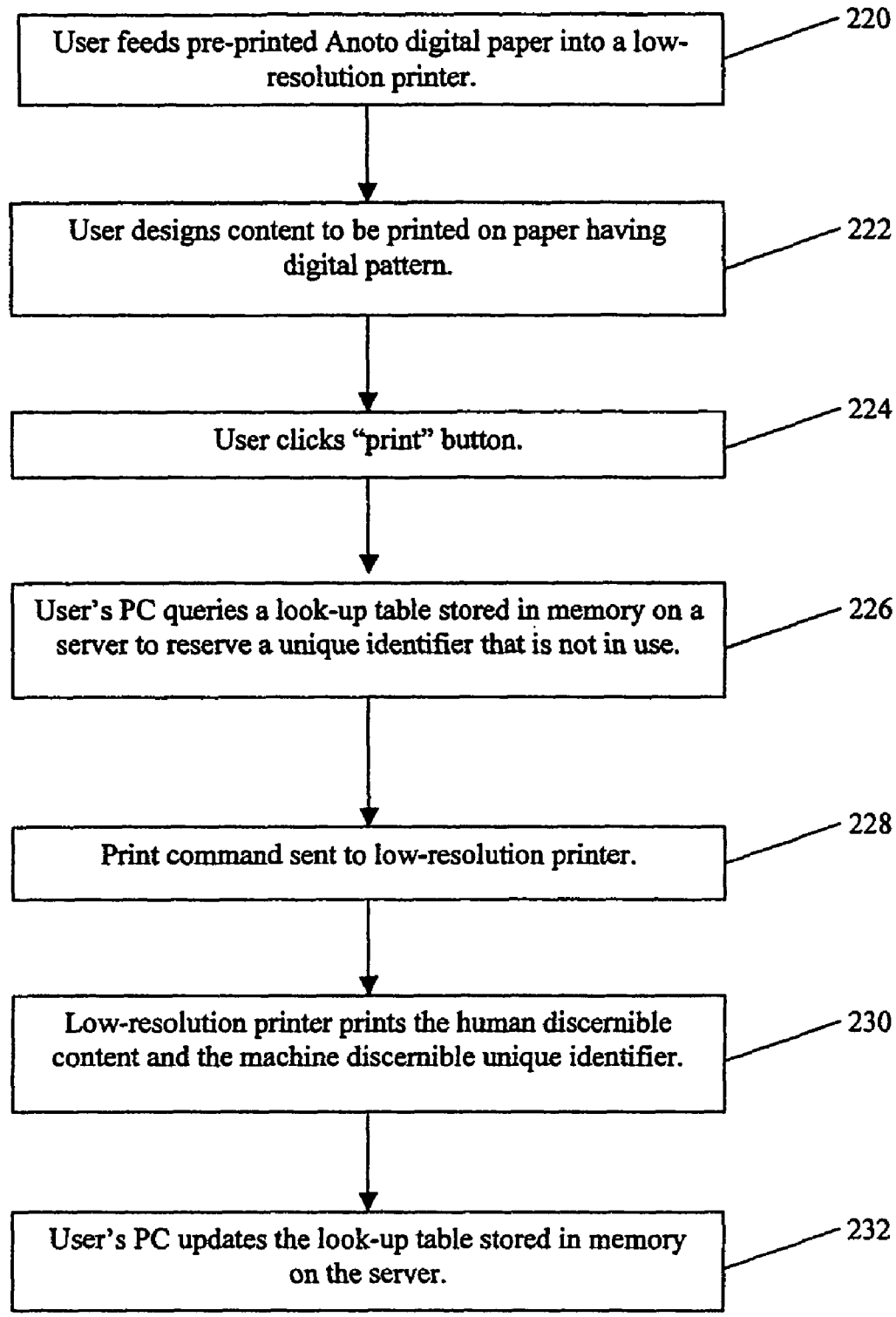
FIG. 10 is a flow diagram showing another embodiment of the invention comprising a method for printing a document having position-determining digital pattern and human readable content, and associating the content with the identity of the position-determining digital pattern as the document is printed.

FIG. 10 is a flow diagram showing another embodiment of a method for printing a document having position determining digital pattern and human readable content, and associating the content with a region of position determining digital pattern as the document is printed. In this embodiment a low-resolution printer is used with pre-printed position determinable digital paper having an area of the page without any pattern on. At step 220, the user puts position determinable digital paper into a paper tray of a low-resolution printer. The paper does not have to be loaded in any particular order, and any user on the network can print using the low-resolution printer without knowledge of what other print jobs have been sent to the low-resolution printer.

At step 222, the user designs content to be printed on paper having digital pattern. The user takes into account that there will be a blank area in the digital pattern when designing the content. In alternative embodiments, the user may have access to software that will design the layout of the document for them. The user only needs to "type and print", and the software will ensure that the content is printed on parts of the page having digital pattern.

At step 224 the user clicks the "print" button. This causes the user's PC to query a database stored in the memory of a server for a unique identifier that is not currently in use, at step 226. The un-used unique identifier is reserved in the database, and any other PC's that query the server will not return the same unique identifier as being un-used. The unique identifier is then incorporated into the print command that is sent to the low-resolution printer at step 228.

At step 230, the low-resolution printer receives the print command from the user's PC and prints the content in human discernible ink and the unique identifier in machine discernible ink. The unique identifier is printed in the space that does not have Anoto digital pattern.

At step 232, the user's PC updates the database stored in the memory on the server. The unique identifier that was previously reserved in the database is now associated with the digital file/record having the content that was printed on the page.

Figure 11:
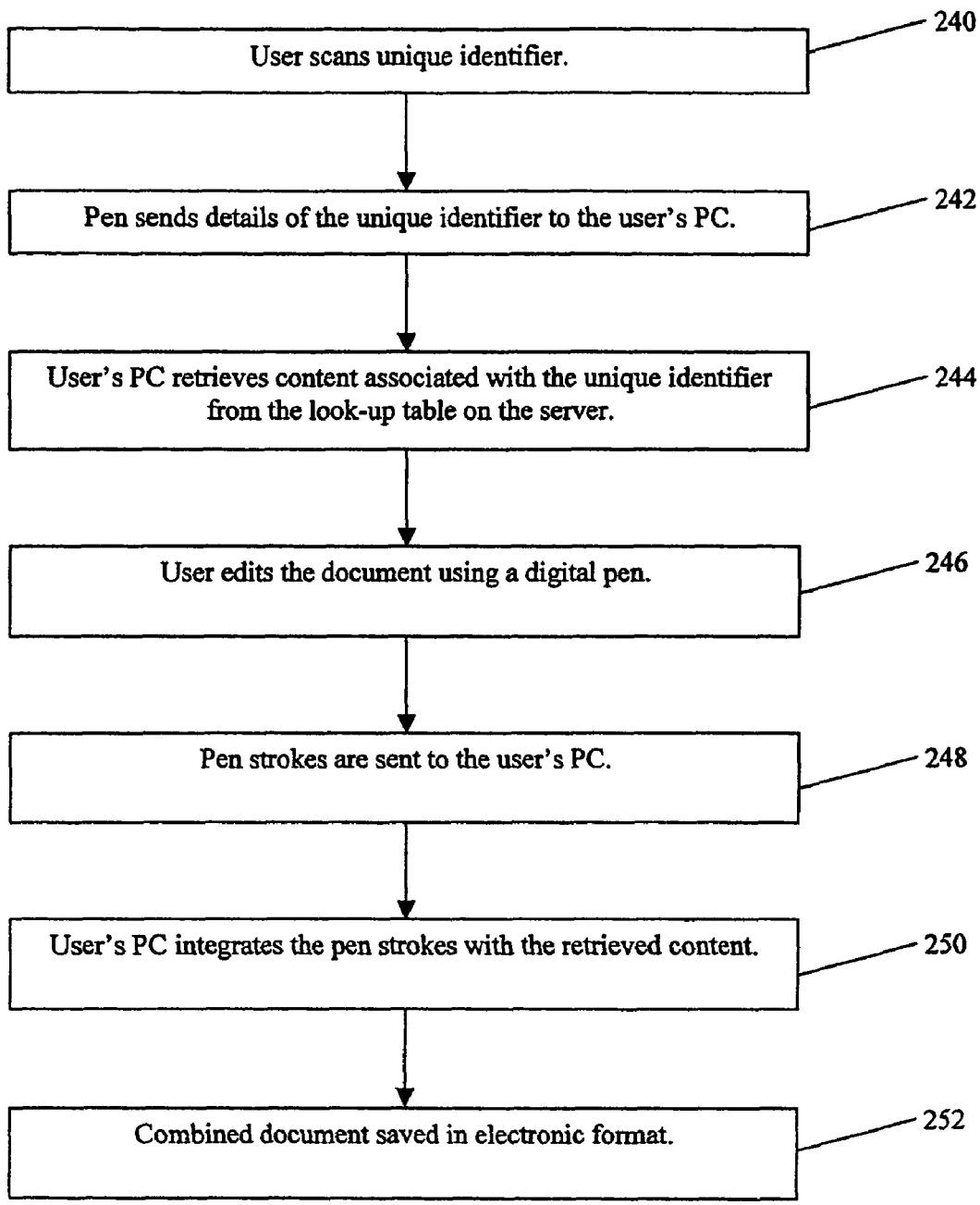
FIG. 11 is a flow diagram of a method according to an embodiment of the invention comprising a method of editing a document created according to the method of FIG. 10.

FIG. 11 is a flow diagram showing one embodiment of a method of editing a document created according to the method of FIG. 10. Before the user begins to edit the paper document with a digital pen, the user scans the low-resolution unique identifier with the digital pen, at step 240. The pen transmits the unique identifier to the user's PC at step 242. The user's PC then queries the database on the server with the identity of the pattern. At step 244, the server returns the content that is associated with the identified pattern to the user's PC, so that the user's PC knows the human discernible content of the sheet that the user is editing.

At step 246, the user begins editing the paper document with the digital pen. Editing can consist of adding, removing or amending text that is part of the content of the document. At step 248, the digital pen transmits the strokes that have been made with the pen to the user's PC. Transmission can be made periodically, or can be made once the user has finished editing the document. At step 250, the user's PC processes the received pen strokes and integrates them with the retrieved content. The combined hand-written and electronic content is then saved as a new electronic document at step 252. In some embodiments, the new electronic document replaces the original electronic content document, in order that any further handwritten amendments to the paper document are combined with any previous handwritten amendments.

Figure 12:
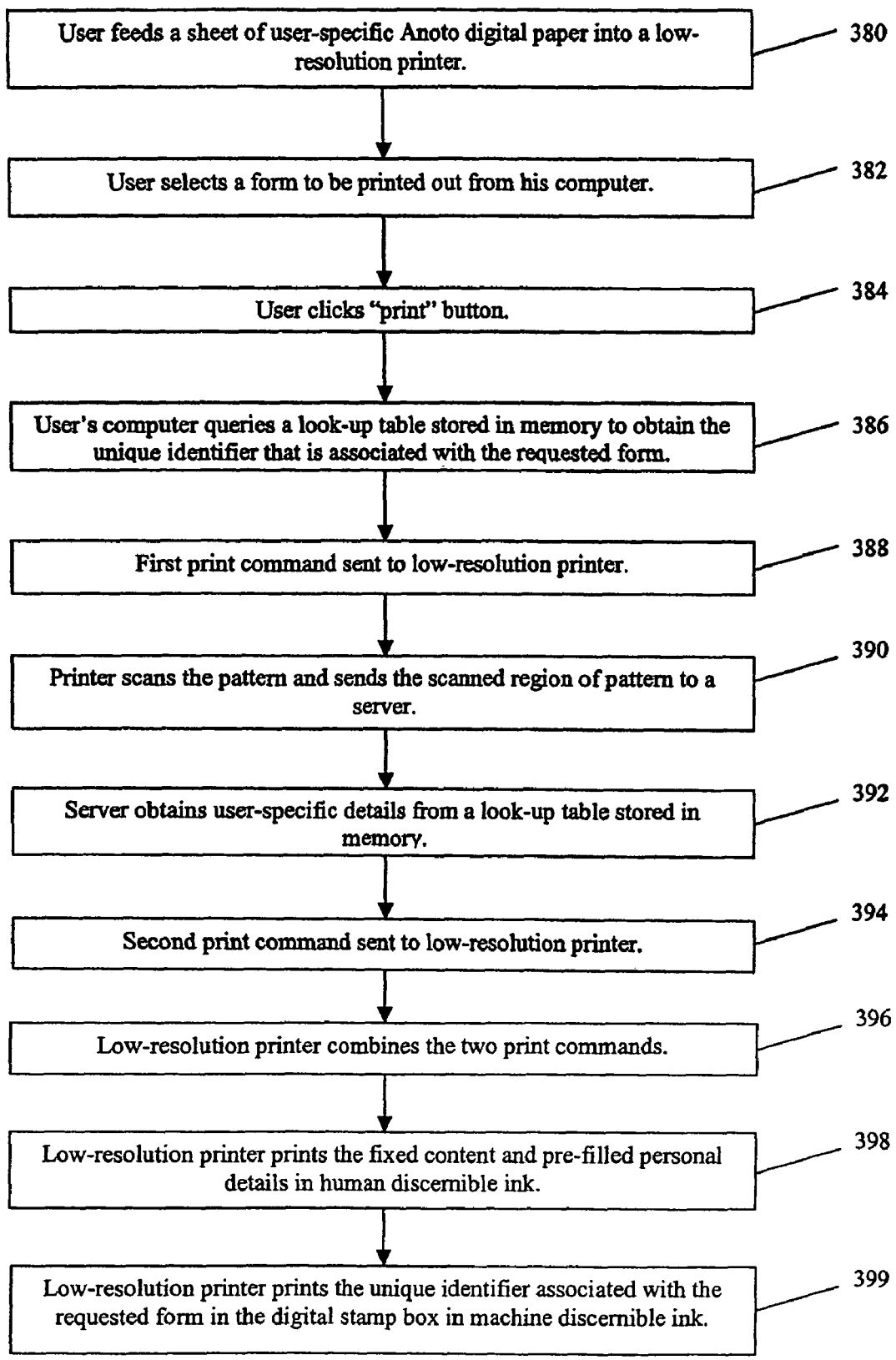
FIG. 12 is a flow diagram showing an embodiment of the present invention in the form of a method for printing out a pre-filled form on digital paper.

FIG. 12 is a flow diagram showing an embodiment of a method for printing out a pre-filled form. In this embodiment, digital paper is used that has a pattern that has already been allocated to a specific user. A correlation between the region of pattern space printed on the digital sheet and a specific user is pre-stored in memory on a server. As a first step, step 380, the user feeds a sheet of his personal pre-printed digital paper into a low-resolution printer. The sheet of digital paper has a blank area, in which a low-resolution unique identifier can be printed.

At step 382, the user selects the type of form that he wants to be printed from his PC (e.g. "expenses claim form", "holiday requisition form", "invoice generation form", or some other form associated with application software which processes content added to the form in a predetermined way, depending upon what form is used). At step 384, the user clicks the "print" button for the desired form. This causes, at step 386, the user's computer to query a look-up table with the identity of the requested form in order to obtain the location in memory of the unique identifier that is associated with that type of form. At step 388, the user's computer then sends a first print command to the low-resolution printer. The print command contains both the fixed form data and the unique identifier associated with the selected form.

At step 390, the printer begins to feed the digital paper past a pattern scanner located on the paper feeder. The paper is fed into the printer far enough for the scanner to read a portion of the digital pattern to recognize the identity of the sheet of digital paper. The printer sends the scanned region of pattern to a server, which identifies on which page of pattern space the region exists. At step 392, a look-up table stored in memory of the server is used to retrieve the user-specific details associated with the identified page. At step 394, the server then sends a second print command to the low-resolution printer. This print command contains the user-specific personal details that the form will be pre-filled with (e.g. the user's name, their address, bank account, supervisor's name, information associated with the purpose of the form, and relevant to the specific user). A pre-filled form is considered desirable in some circumstances.

At step 396, the processor within the low-resolution printer combines the two print commands to make one print command containing the fixed form content, the user's personal details for pre-filling parts of the form, and the unique identifier that can be used to recognise the type of form on the digital sheet.

Steps 390 to 396 can all be done fast enough so that there is no need to stop the paper feeding through the printer between scanning and recognizing the identity of the sheet of paper and printing the document. If necessary, the printer can temporarily stop feeding the paper through the printer in order to wait to receive the print commands.

The low-resolution printer prints the fixed content combined with the user-specific personal details in human discernible ink at step 398, and the unique identifier in machine-readable ink at step 399.

This embodiment of the invention will be particularly useful when a user frequently works in different locations (e.g. different offices, or parts of a building). The user can use his specific paper, which has been pre-associated with his details, to print out forms pre-filled with his personal details in any location that has a printer according to this embodiment of the invention. It may be desirable for the user to carry a supply of their own patterned paper.

In alternative embodiments, a unique identifier is not used to identify the type of form, and the type of form is associated with the identity of the scanned sheet of digital paper.

Figure 13:
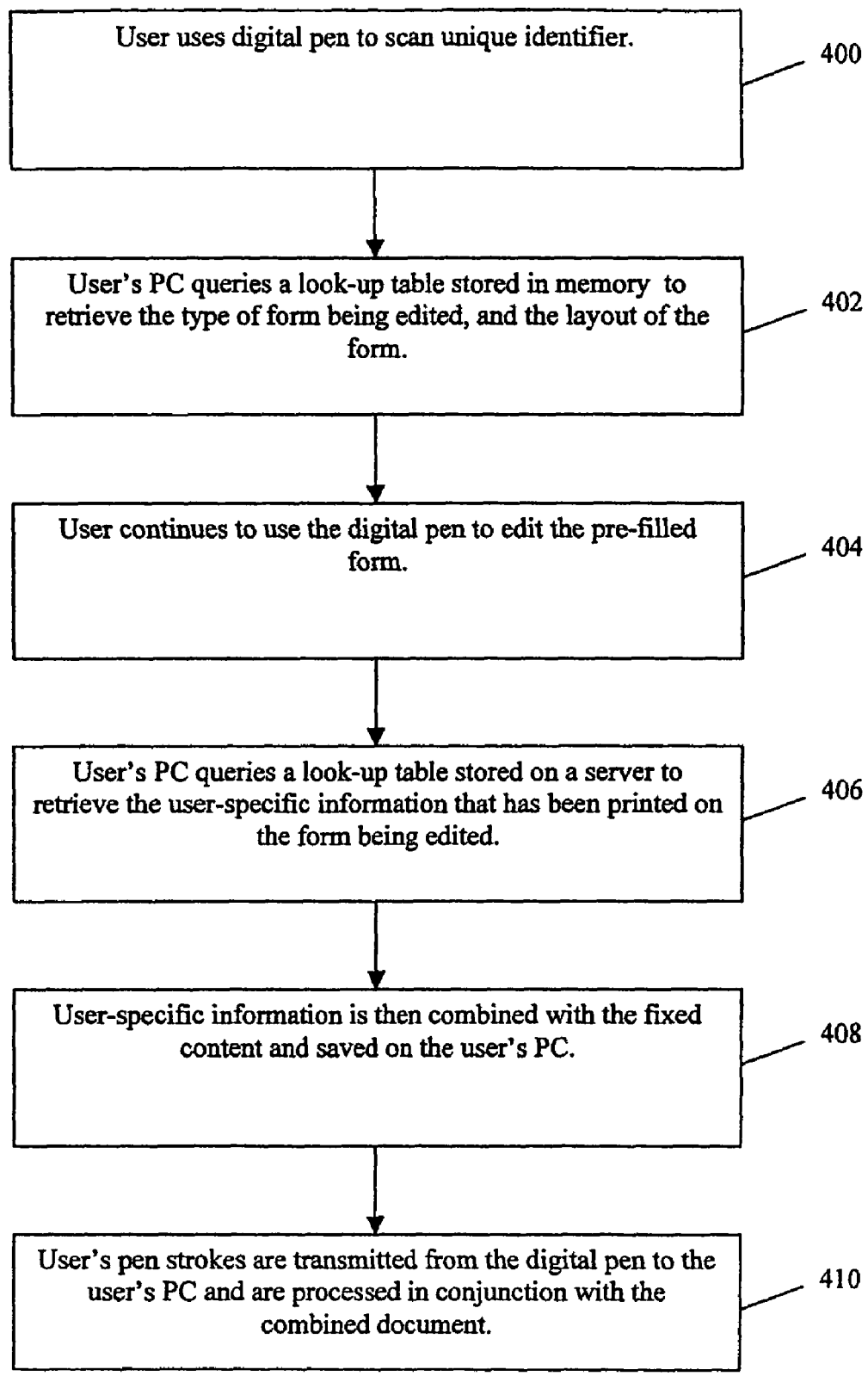
FIG. 13 is a flow diagram showing an embodiment of the invention comprising a method for editing a document created by the method of FIG. 12.

FIG. 13 is a flow diagram showing a method of editing the form created by the method of FIG. 12. The user uses a digital pen to scan the unique identifier on the digital page and the identity of the unique identifier is sent to the user's PC by the digital pen at step 400. At step 402, the user's PC queries a look-up table stored in memory to retrieve the type of form that has been printed on the digital sheet, and the layout of the fixed content of the form is then stored locally in the memory of the PC.

At step 404, the user continues to use the digital pen to edit the human discernible content of the form. As the pen passes over the digital paper, information derived from the dot pattern to enable the position of the pen to be established is sent back to a processor within the user's PC, which then associates the human-added content with the pre-existing digital content. In alternative embodiments, a processor within the pen decodes the scanned dot pattern to determine the movement of the nib of the pen. At step 406, the user's PC queries a look-up table stored in the memory of a server, to obtain the location in memory of the user-specific information associated with the identified sheet of digital paper, or region of the sheet. The user-specific information is then combined with the fixed content already saved in the local memory of the user's PC and saved, at step 408.

At step 410, the user's pen strokes are transmitted from the digital pen to the user's PC and are processed in conjunction with the combined document that has been saved in the local memory of the user's PC.

Figure 14:
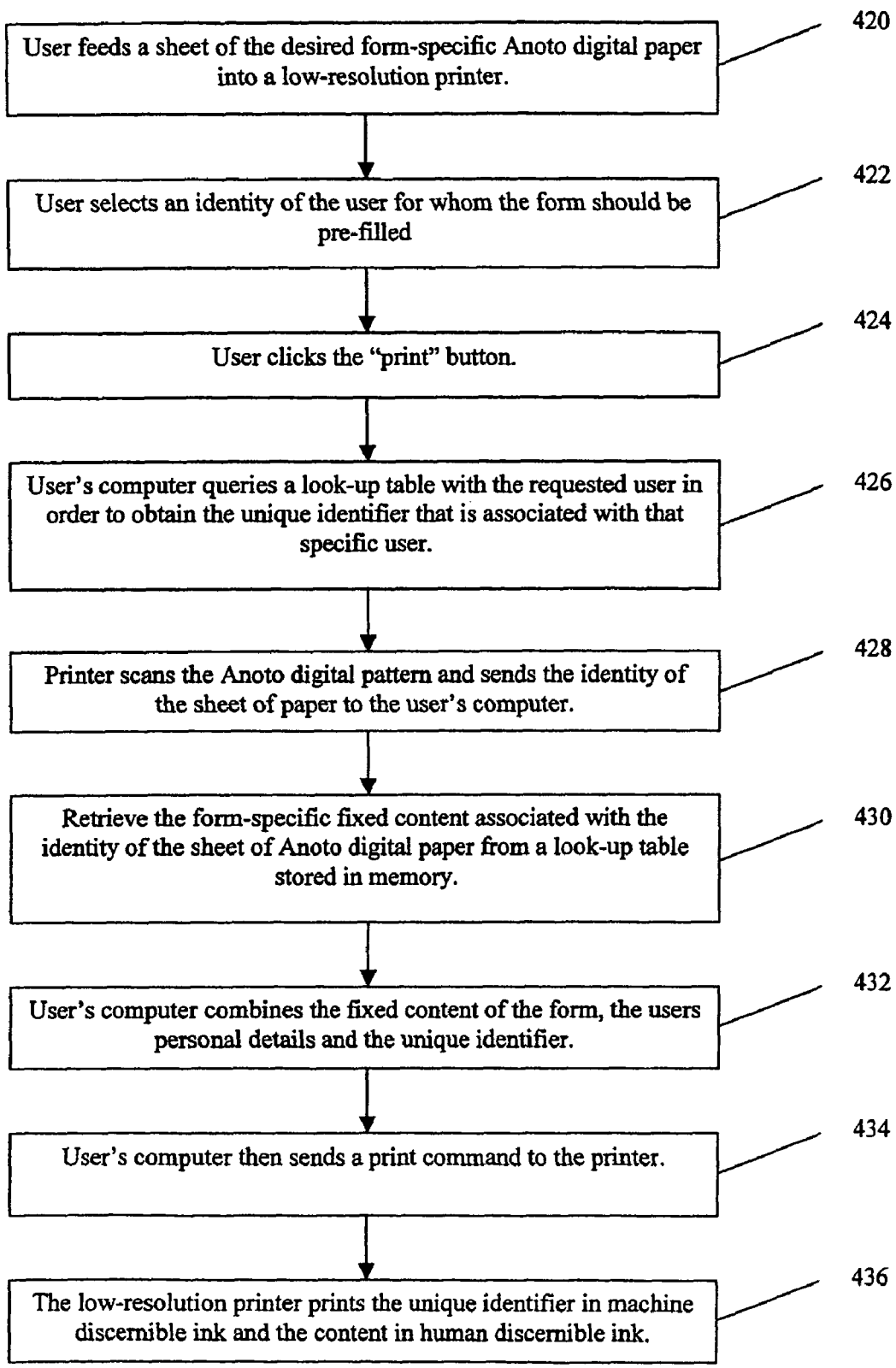
FIG. 14 is a flow diagram showing another embodiment of the invention comprising a method for printing out a pre-filled form on digital paper.

FIG. 14 is a flow diagram showing another embodiment of a method for printing out a pre-filled form. In this embodiment, Anoto digital paper is used that has a pattern that has already been allocated to a specific type of form. A correlation between a region of digital pattern and the layout of a type of form is stored in memory on a server. As a first step, step 420, the user feeds a sheet of the desired form-specific Anoto digital paper into a low-resolution printer. The sheet of Anoto digital paper has a blank area, in which a low-resolution unique identifier can be printed.

At step 422, the user selects from his PC an identity of a user for whom the form should be pre-filled. At step 424, the user clicks the "print" button for the desired user. This causes, at step 426, the user's computer to query a look-up table with the requested user in order to obtain the unique identifier that is associated with the requested user.

At step 428, a print command is sent to the printer to begin feeding the Anoto digital paper past a pattern scanner located on the paper feeder. A portion of the dot pattern that has been pre-printed on the Anoto digital paper is scanned and returned to the user's computer. At step 430, a look-up table stored in memory of the server is used to return to the user's computer the memory location of the form-specific fixed content associated with the identified region of digital pattern.

At step 432, the user's computer combines the fixed content of the form, the users personal details for pre-filling parts of the form and the unique identifier that can be used to recognise user for whom the form has been pre-filled, in order to construct a print command.

At step 434, the user's computer sends the print command to the low-resolution printer.

The low-resolution printer prints the unique identifier in machine discernible ink and the content in human discernible ink at step 436.

In alternative embodiments, the printer can combine the user's personal details and fixed content of the form itself in order to construct the print command. In further embodiments the fixed content and user's personal details may be stored in memory within the printer, and the user's PC is not involved in the print operation after the "print" button is clicked. In further embodiments still, the "print" button is on the printer itself, and the printer can be used as a stand-alone machine, without the need for a PC, for printing out pre-filled forms, pre-filled (when printed out) with user-specific content/information, or form specific content, or both. There will usually be other things to be filled in on the form manually by the user, typically in spaces having position-determining pattern in them.

Figure 15:
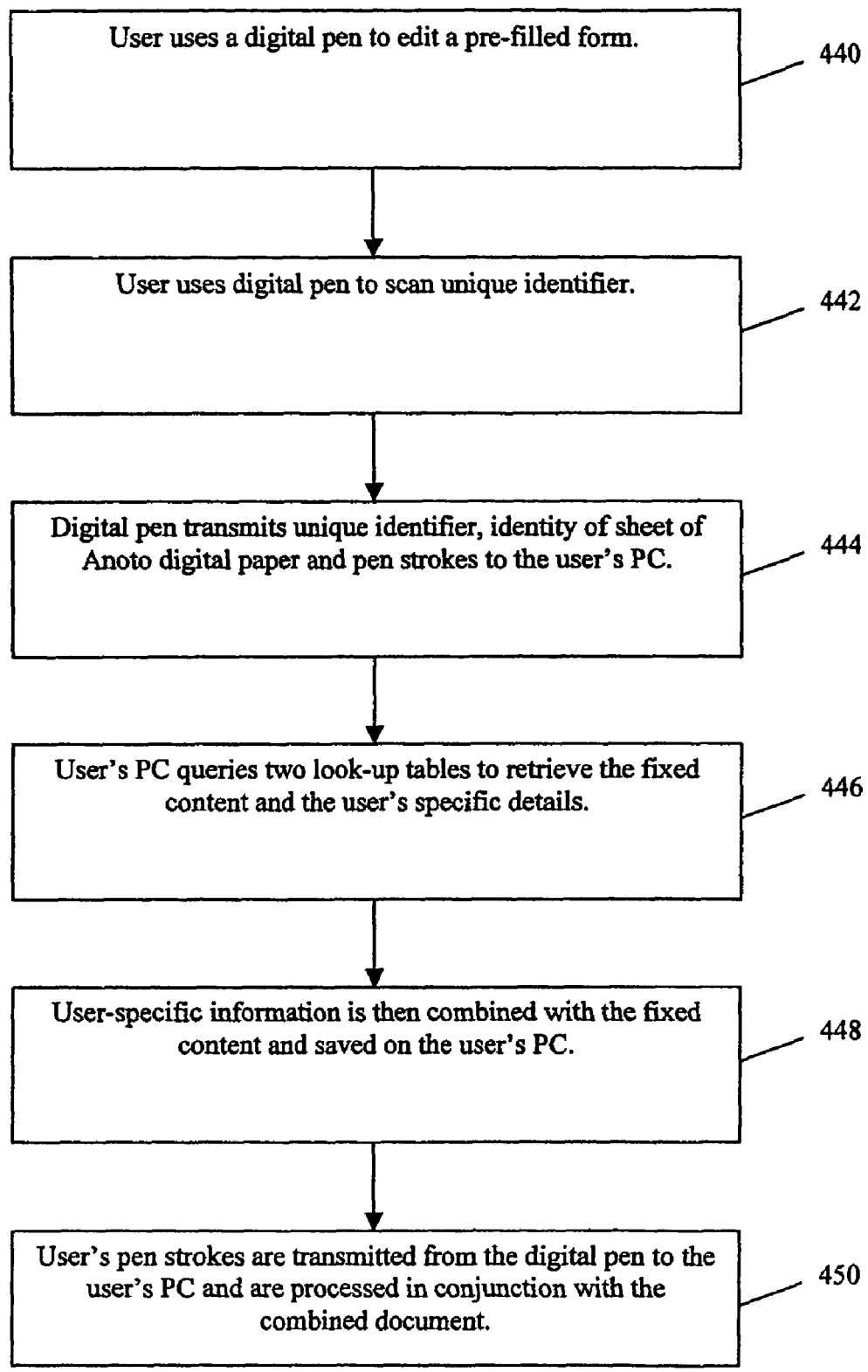
FIG. 15 is a flow diagram showing an embodiment of the present invention in the form of a method for editing a document created by the method of FIG. 14.

FIG. 15 is a flow diagram showing a method of editing the form created by the method of FIG. 14. At step 440, a user uses a digital pen to edit, delete, or add to, the human discernible content of a form. As the pen passes over the Anoto digital paper, the dot pattern is recognized and the sheet of paper that the digital pen is editing is stored locally in memory on the digital pen. The identity of the sheet of digital paper and the pen strokes are stored within the memory of the pen.

The user then uses the digital pen to scan the unique identifier on the digital page. The unique identifier is also stored in the memory of the digital pen at step 442.

At step 444, the digital pen transmits the identity of the sheet of paper, the pen strokes and the unique identifier to the user's PC.

At step 446, the user's PC then queries two look-up tables stored in memory. The memory location of the fixed form content associated with the identified sheet of Anoto digital paper is retrieved from one table, and the memory location of the user specific details associated with the unique identifier are returned from the other table. The content and personal details are then combined and stored in memory of the PC at step 448.

At step 450, the user's pen strokes are transmitted from the digital pen to the user's PC and are processed in conjunction with the combined document that has been saved in the local memory of the user's PC.

Figure 16:
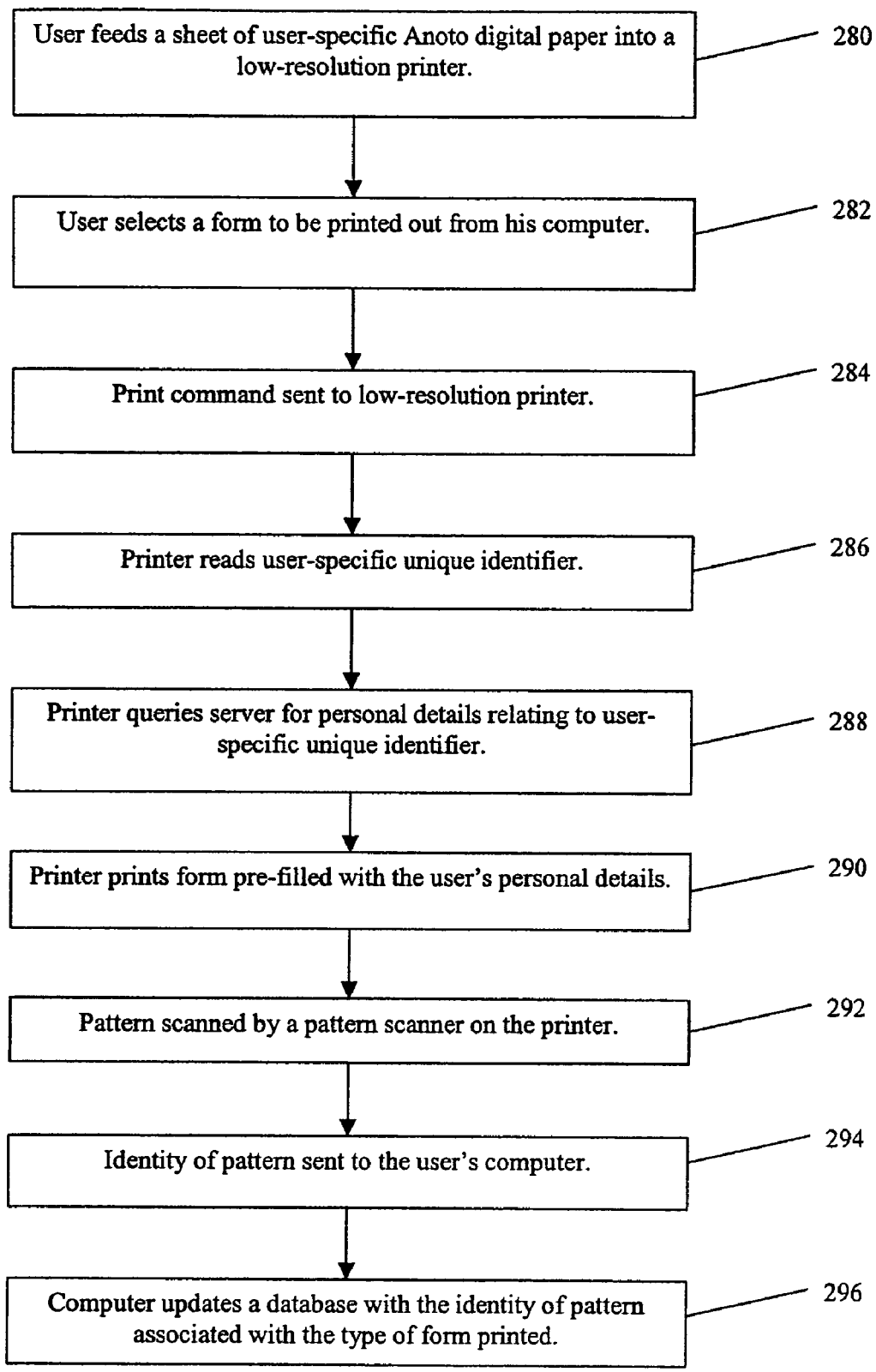
FIG. 16 is a flow diagram showing an embodiment of the invention in the form of a method for printing out a pre-filled form on digital paper.

FIG. 16 is a flow diagram showing another embodiment of a method for printing out a pre-filled form on digital paper. The digital paper is pre-printed with a unique identifier that has been reserved for use with a specific user. In one embodiment a user will have lots of sheets of digital paper (e.g. hundreds of sheets) with his own specific unique identifier printed thereon. The user can then feed his sheet/s into a low-resolution printer when he desires a form to be printed with his personal details pre-filled into the form.

An association between the user's specific personal details and the unique identifier assigned to the user is pre-stored in a database in the memory of the user's computer, or a networked server.

At step 280, the user feeds a sheet of digital paper associated with the person for whom the form should be printed into a low-resolution printer. At step 282, the user returns to a computer on the network and chooses the type of form that he requires to be printed out. The user does not need to input any personal details into the computer, as all of the personal details are stored in a database in the memory of a server and are associated with the unique identifier pre-printed on the digital sheets. In some embodiments, the form may be any one of a: tax return form, work expenses form, holiday booking form, time recording form, or any other type of form that includes details that are not changed very often.

At step 284, the user's computer sends a print command identifying the type of form that is required to the printer. The print command contains details of the fixed content of the form. At step 286, the printer scans the sheet of paper and reads the unique identifier specific to the user. At step 288, the processor within the printer communicates with a server on the network, and queries a database stored in the memory of the server with the unique identifier read from the digital paper. The server returns to the printer the personal details of the user to whom the digital paper belongs. The processor within the printer then integrates the relevant sections of the requested form with the personal details retrieved form the server.

At step 290, the printer prints out the form with the personal details sections pre-filled with the personal details of the user. The low-resolution printer then scans the digital pattern on the page at step 292. The print job is not interrupted as the pattern is scanned. The processor within the printer recognizes the identity of the sheet of paper as it is scanned and sends this identity to the user's computer at step 294. The user's computer then stores the association between the scanned region of digital pattern and the type of form that has been printed in a database in memory, at step 296.

In other embodiments, the digital pattern may be scanned by the printer before or during the print job.

Figure 17:
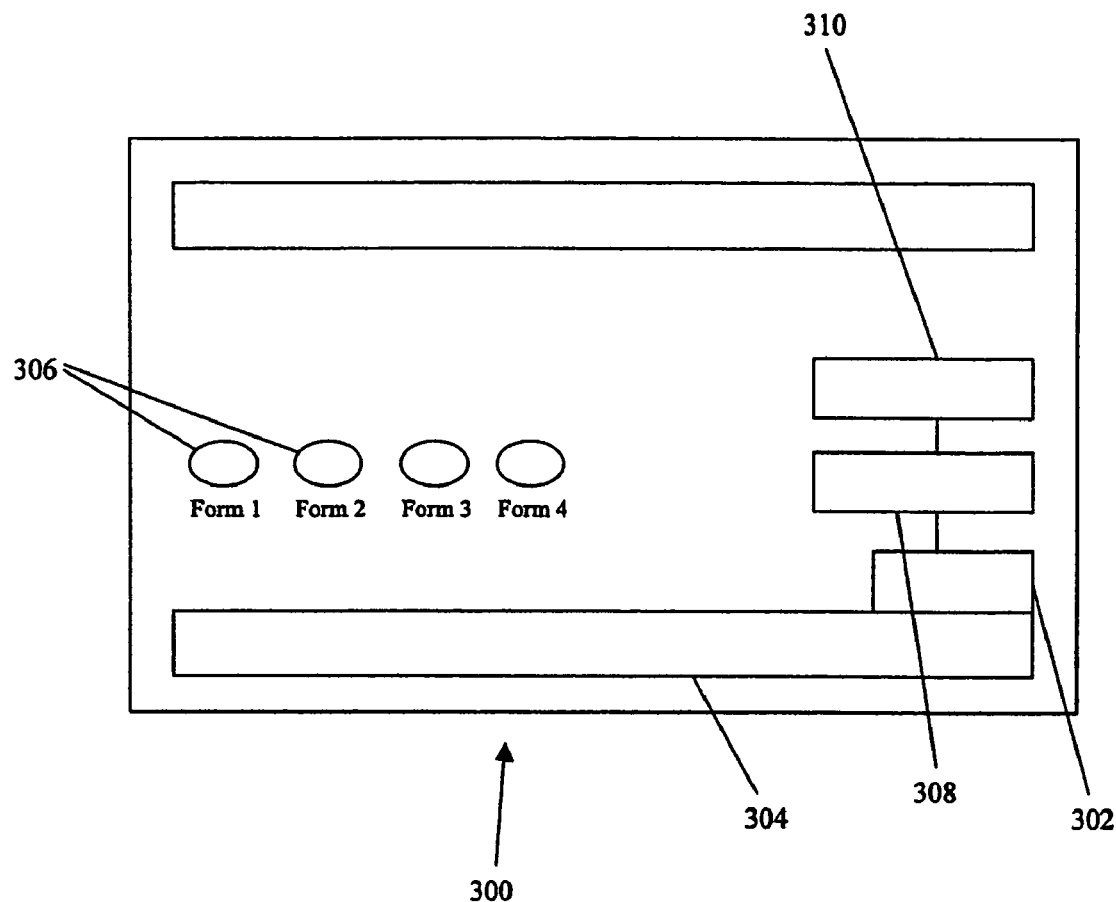
FIG. 17 shows schematically an alternative embodiment of a printer in accordance with an aspect of the invention, for printing out a form with pre-filled user-specific details.

FIG. 17 shows schematically an alternative embodiment of a printer 300 for printing out a form with pre-filled user-specific details. The advantage of this embodiment is that the user does not need a computer in order to print out a form. The printer 300 according to this embodiment is configured to print different forms dependent upon command instructions input at the printer 300 itself. The instructions can be input by a user manipulated interface, for example, by buttons 306.

The user puts a sheet of digital paper that has been pre-printed with a user-specific identifier, into the paper tray 304 of the printer 300. The user then selects which form he requires by pressing one of the buttons 306, which causes the printer to feed the digital paper past the pattern scanner 302. The pattern scanner 302 is arranged such that the pattern scanner scans the user-specific identifier on the sheet as the paper passes underneath the pattern scanner 302. The scanned identifier is communicated to the print controller 308 which can identify the unique-identifier and retrieve the associated personal details from a memory 310 within the printer, or from a networked resource, such as a central/commercial server. The print controller 308 then prints out the human discernible content of the form, with the personal details of the user pre-filled. The pattern scanner 302 is also arranged to scan and identify a portion of the digital pattern as the paper passes through the printer 300. The identity of the sheet of digital paper is then stored in a database in memory 310 and associated with the type of form that has been selected.

In an alternative embodiment, the printer 300 of FIG. 17 can be in communication with a PC (not shown in the Figure). When the printer 300 scans the unique identifier, the print controller 308 communicates with memory located on the PC to retrieve the personal details of the user who is associated with the unique identifier. Also the database used to store the association between the scanned region of digital pattern and the type of form can be stored in memory on the PC.

Figure 18:
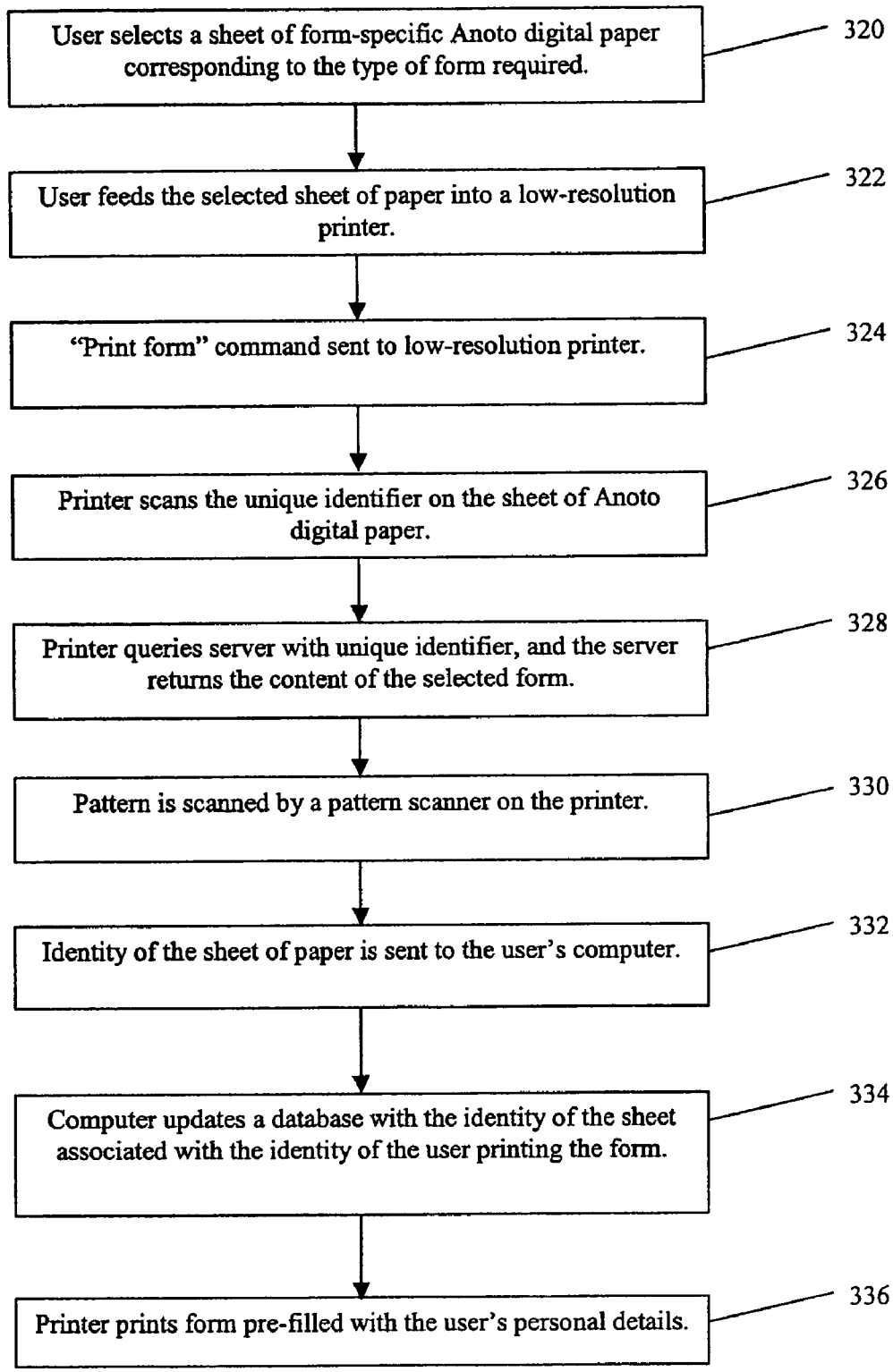
FIG. 18 is a flow diagram showing another embodiment of the invention in the form of a method for printing out a pre-filled form on digital paper.

FIG. 18 is a flow diagram showing an alternative embodiment for printing out a pre-filled form using digital paper specific to a type of form. In this embodiment, the user selects a sheet of digital paper with a pre-printed unique identifier corresponding to the type of form that the user desires to print, at step 320. The unique identifier also, in this example, contains information relating to the font, layout and colour of the form to be printed. The user feeds the selected sheet of digital paper into the low-resolution printer at step 322, and then sends a "print form" command to the printer from his computer at step 324. The print command contains the personal details of the user that are to be printed on the form. No details of the type of form that is desired to be printed are sent from the user's computer to the printer, as the desired form is obtained from the unique identifier that has been pre-printed on the sheet of digital paper.

In other embodiments, the desired form is obtainable from the position in pattern space of the digital dot pattern pre-printed on the sheet on which the form is to be printed. Alternatively, the desired form may be obtained from any other suitable identifier associated with the sheet of digital paper.

As the paper feeds into the printer, a pattern scanner within the printer scans the unique identifier at step 326. At step 328, a database stored in the memory of a server is queried with the scanned unique identifier. The server returns the fixed content of the desired form associated with the unique identifier to the printer, and the processor within the printer then combines the fixed content of the form and the user-specific personal details into one file that is to be printed.

At step 330, a pattern scanner within the printer scans a portion of the digital pattern and recognizes the identity of the sheet of digital paper being used. At step 332, the identity of the sheet of paper is sent to the user's computer. The user's computer then associates the received identity of the sheet with the identity of the user for whom the form was printed, at step 334. The low-resolution printer then prints out the content of the form retrieved from the server with the pre-filled data that accompanied the print command at step 336.

In other embodiments, the pattern is scanned during or after the print and store association operation, that is steps 330 to 334.

In an alternative embodiment to that of FIG. 18, the print command does not contain the personal details of the user requesting the form to be printed. The printer recognizes the identity of the user sending the print command, and queries a database with this identity in order to obtain the personal details of the user.

Figure 19:
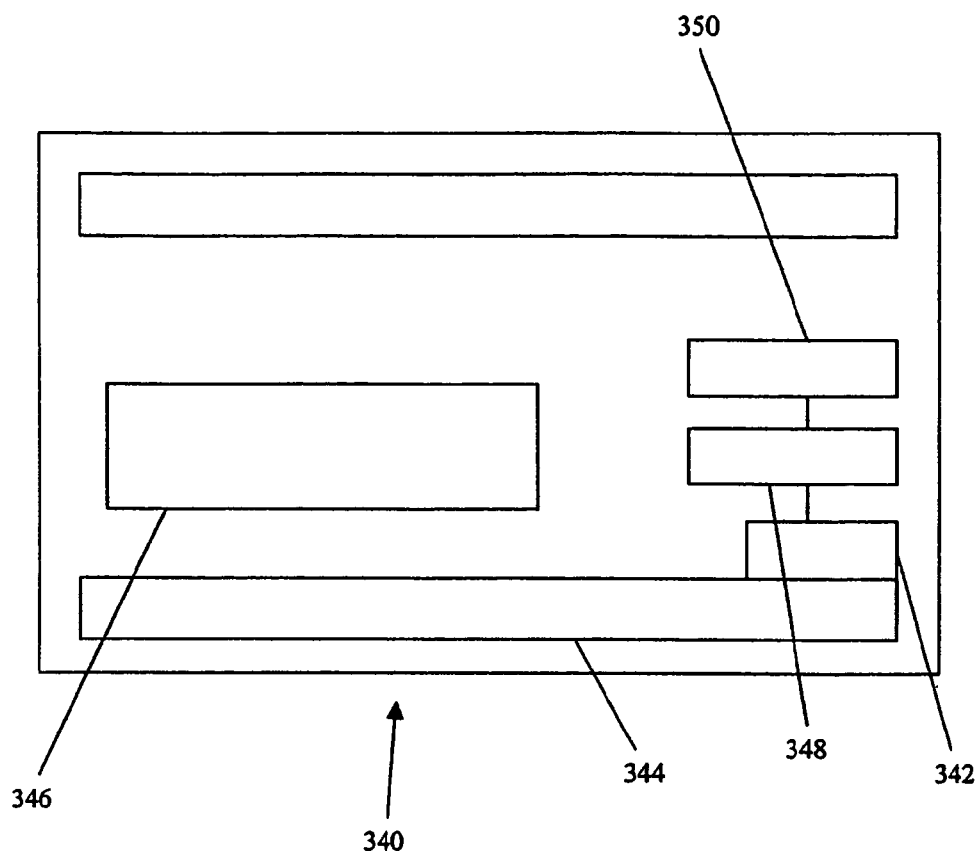
FIG. 19 shows schematically an alternative embodiment of the invention in the form of a printer for printing out a form with pre-filled user-specific details.

FIG. 19 shows schematically an alternative embodiment of a printer for printing out a form with pre-filled user-specific details. The advantage of this embodiment is that the user does not need a computer in order to print out a form pre-filled with the user's personal details. The printer according to this embodiment of the invention has a machine discernible ink in at least one of its ink cartridges.

In this embodiment the printer 340 has an interactive touch-screen display 346 that can be used for giving instructions to the printer. The user feeds into the printer a sheet of Anoto digital paper that has a region of pattern space on it that has already been allocated to the layout of a specific type of form.

The user then uses the interactive screen 346 to select a user from a pre-determined list for whom the form should be pre-filled. This causes a processor 348 within the printer 340 to retrieve from memory 350 the user-specific details for the selected user and the unique identifier associated with the user.

In alternative embodiments, user-specific details are stored in a memory located off-printer, for example on a server.

The printer 340 feeds the paper past the pattern scanner 342, and the pattern scanner identifies the specific sheet of Anoto digital paper being used. The print controller 348 queries the memory 350 within the printer 340, to retrieve the fixed content of the form corresponding to the identified form. The print controller combines the fixed content and user specific content and prints out the pre-filled form in human discernible ink, and prints out the unique identifier associated with the user in machine discernible ink.

The documents created according to any one of the methods illustrated in FIG.'S 16 to 19, can be edited by using a similar method as illustrated in FIG. 13 or FIG. 15.

Figure 20:
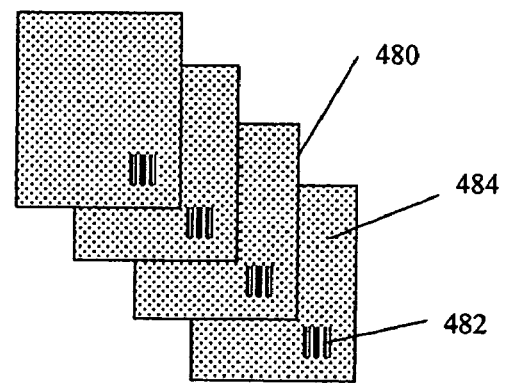
FIG. 20 shows schematically a stack of sheets of paper according to some embodiments of the present invention.

FIG. 20 shows schematically a stack of sheets of paper 480 according to some embodiments of the present invention. Each sheet of paper 480 has the same position determining digital pattern 484 pre-printed on it. Each sheet 480 also has an identifying code 482 pre-printed on it, each identifying code 484 being different to the other identifying codes pre-printed on sheets of paper 480 in the stack. This enables lots of sheets of paper with the same digital pattern to be distinguished from each other by their identifying codes.

Figure 21:
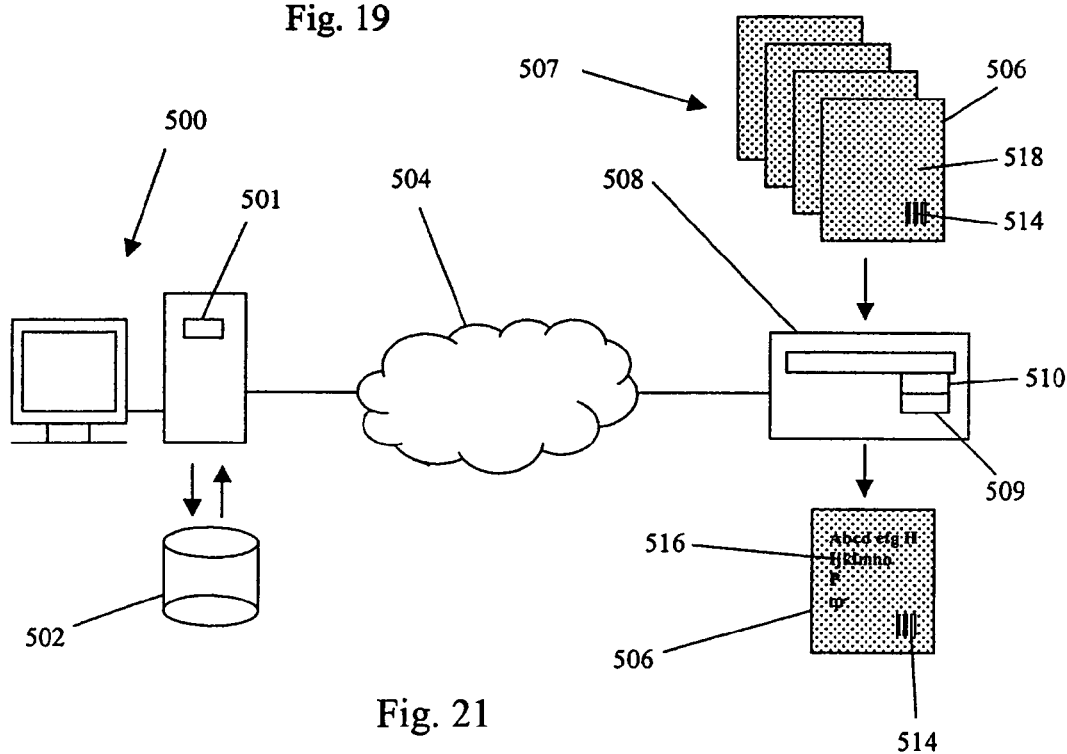
FIG. 21 shows schematically an embodiment of the invention comprising a system for printing documents on sheets of paper according to FIG. 20.

FIG. 21 is a schematic illustration of a system for printing human discernible content on a sheet of paper 506 from a stack 507 of sheets as illustrated in FIG. 20, and associating in computer memory 502 a digital electronic version of the printed human discernible content 516 with the identity code 514 on which the content is printed. The system comprises a workstation 500, computer memory 502, a network 504 and a printer 508. The printer 508 comprises an identity code scanner 510 arranged to scan an identity code 514 that has been pre-printed on a sheet of paper 506 as it passes through the printer 508.

When a user desires to print a document having both machine discernible pattern and human discernible content, a print command is sent from the workstation 500 to the printer 508. The print command will usually be sent via a network 504, which can be a local area network (LAN), metropolitan area network (MAN), the Internet or any other network. Alternatively, the print command can be sent directly from the workstation to the printer, and not via a network.

The printer 508 has a stack of paper 507 having pre-printed digital pattern 518 and pre-printed identity codes 514 in its paper tray. The printer 508 feeds a sheet of paper 506 from the stack 507 into the printer 508 at the start of the print job. As part of the operation of printing content 516 onto the sheet of paper 506, the identity code scanner 510 scans the identity code 514 pre-printed on the sheet of paper 506.

A processor 509 within the printer 508 transmits information relating to the scanned identity code 514 back to a processor 501 within the workstation 500. The processor 501 within the workstation 500 then associates the received scanned identity code with a digital electronic version of the printed human discernible content, and stores the association in computer memory 502.

A document created by this system can be subsequently edited by a similar method as described with reference to FIG. 11 or 13.

The invention claimed is:

1. A method of associating in computer memory (i) a digital electronic version of printed human-discernible content of a printed document comprising a sheet having a machine-readable pattern wherein said machine readable pattern enables the determination of the position of a digital pattern reading device, with respect to said sheet, when the digital pattern reading device is placed on the sheet and said human discernible content (ii) the identity of said sheet upon which the content is printed, the method comprising:
  printing the content onto a sheet using a second printer, said sheet comprising a pre-patterned sheet that has been pre-printed by a first printer with said pattern;
  in which said first printer has a higher print resolution than the second printer;
  associating a machine-readable identity code with said sheet at around the time of printing said human-discernable content, wherein said identity code is read from said sheet by said second printer; and
  storing a correlation between said identity code and said digital electronic version of printed human-discernable content in computer memory.

2. A method according to claim 1 wherein said identity code is printed on said sheet by said second printer.

3. A method according to claim 2 wherein a plurality of sheets have the same pre-printed pattern as provided by the first printer and are given individual identities by using said second printer to apply different machine-readable identity codes to each of them at around the time of printing each sheet.

4. A method according to claim 1 wherein said machine-readable identity code comprises at least one code from the group:
  (i) a pattern of dots;
  (ii) a pattern of lines;
  (iii) a pattern of printed objects whose positions and/or shapes code for an identity;
  (iv) a position determining pattern;
  (v) a bar code.

5. A method according to claim 1 wherein the second printer which prints said content onto said pre-patterned sheet has a pattern reading device, and wherein said second printer acquires data from said pre-printed pattern on the said sheet that is to be printed with content, in order to enable the identity of pattern on said sheet to be established, thereby enabling said association to be made in computer memory;
  said second printer uses data from a digital electronic version of content to print said content onto said pre-patterned sheet; and
  wherein said association is made in computer memory between said digital electronic version of said content and said identity of pattern.

6. A method according to claim 5 wherein said pre-printed pattern is associated in computer memory with specific digital electronic content and wherein upon recognition of said pattern using data acquired by said pattern reading device of said second printer, said specific digital electronic content is caused to be printed onto said pre-patterned sheet as human-discernible content.

7. A method according to claim 6 wherein different users have different pattern associated with them and wherein upon recognition of their pattern from data from said second printer's pattern reading device said content printer is caused to print user-specific content onto said sheet.

8. A method according to claim 1 wherein said human-discernible content comprises document-type content and user-specific content, wherein one from the group:
  (i) document-specific content; and
  (ii) user-specific content is selected by a user, and the other from said group is obtained from a predetermined correlation between said identity code that has been read by said printer and a digital electronic version said content.

9. A method according to claim 1, wherein pre-printed digital paper is taken from said first printer and put into a plurality of second printers.

10. The method according to claim 1, wherein the second printer is an existing legacy printer.

11. A method of associating in computer memory a digital electronic version of printed human discernible content of a printed document with an identity code adapted to identify said document, the method comprising:
using a plurality of pages of pre-patterned digital paper that have been pre-printed by a first printer with a position-determining pattern, said pattern being adapted to enable a digital pen to acquire information from said pattern to enable the position of said pen on said pattern to be determined;
printing said content on said digital paper using a second printer;
using said second printer to read an identity code from the digital paper;
in which said identity code with the digital paper;
in which said identity code is a user-specific identity code and in which, upon recognition of said user-specific identity code, said second printer is caused to print user-specific personal details about the user along with said human discernible content onto said pre-printed digital paper; and
associating in computer memory, using said code, at the time of printing said content onto said pre-patterned paper, a digital electronic version of said content with the identity code for the particular sheet of digital paper upon which said content is printed.

12. A method as claimed in claim 11 wherein an identity code adapted to distinguish a specific sheet of pre-pattern digital paper is printed onto said specific sheet as part of an operation of printing said content onto said specific sheet, said identity code being readable by a digital pen and being capable of being used to distinguish data acquired by a digital pen from said specific sheet from data acquired by said pen from other sheets of pre-patterned paper having the same position-determining pattern on them as does said specific sheet.

13. A method according to claim 11 wherein an identity code adapted to distinguish a specific sheet of pre-patterned digital pattern is printed on said specific sheet in an operation prior to printing said content onto said specific sheet, and wherein a second printer which prints said content onto said pre-patterned paper has an identity code reading device, said second printer being capable of acquiring data from said identity code, said identity code being capable of being used to distinguish data acquired by a digital pen from said specific sheet from data acquired by said pen from other sheets of pre-patterned paper having the same position-determining pattern on them as does said specific sheet, to enable said association to be made between said digital electronic version of said content and said identity code.

14. A method according to claim 13 wherein said identity code is associated in computer memory with specific digital electronic content and wherein upon recognition of said identity code using data acquired by said identity code reading device of said second printer, said specific digital electronic content is caused to be printed onto said pre-patterned sheet as human discernible content.

15. A method according to claim 11 wherein a plurality of different identity codes are printed on a respective plurality of pre-patterned sheets each having the same pre-printed position-determining pattern, said identity codes enabling a digital pen to acquire sheet identity data to enable data acquired from each sheet to be distinguished from data acquired from other sheets.

16. A method according to claim 15 wherein an area of said sheets from the group:
(i) all of a surface of each of the sheets;
(ii) substantially all of a surface of each of the sheets;
(iii) at least half of the surface area of each of the sheets;
(iv) at least a tenth of the surface area of each of the sheets;
are pre-printed with pattern.

17. A method according to claim 11 wherein said identity code is printed in an area of said pre-patterned paper which is from the group:
(i) free of pattern;
(ii) substantially free of pattern.

18. A method according to claim 11 wherein said second printer is (i) not capable of printing said pattern satisfactorily; or (ii) configured not to be capable of printing said pattern satisfactorily.

19. The method as claimed in claim 11, wherein the second printer is an existing legacy printer.

20. The method as claimed in claim 11, in which said user-specific content is accessed by said second printer from a memory within said second printer.

21. A method of combining pen strokes made with a digital pen upon a digital sheet having pen position-determining pattern printed upon it and human-discernible content printed upon it comprising:
printing said sheet with said pattern in a pre-patterning operation with a first printer to create a pre-patterned sheet;
subsequently printing said content onto said pre-patterned sheet using a second printer to create a content-printed digital sheet;
with said second printer, printing an identity code on said sheet to enable the identity of said sheet to be established in a subsequent pen-on-sheet writing operation, the printing of said identity code occurring in the same time frame as printing said content onto said sheet;
in which said second printer further comprises a pattern reading device wherein said pattern reading device scans said pre-printed pattern on the said sheet in order to enable the pattern on said sheet to be identified;
in which said identity code corresponds to a predetermined set of human-discernible content and in which, upon recognition of said identity code, said second printer is caused to print user-specific content along with said predetermined set of human-discernible content onto said pre-printed digital paper;
associating in computer memory a link between said identity code and an electronic version of said content that was printed on said sheet;
using a digital pen to make pen strokes on said content-printed sheet;
conveying said pen-acquired pen-position data, relating to the position of said pen in said pattern to a processor;
using the digital pen to acquire said identity code from said content-printed sheet;
the processor using the pen-acquired identity code, the pen acquired pen-position data, and the link between said identity code and said electronic version of said content to combine said pen strokes with said content.

22. The method as claimed in claim 21, wherein the second printer is an existing legacy printer.

23. The method as claimed in claim 21, in which said user-specific content is accessed by said second printer from a print command sent to said second printer.

* * * * *

UNITED STATES PATENT AND TRADEMARK OFFICE
CERTIFICATE OF CORRECTION

| | | |
|---|---|---|
| PATENT NO. | : 8,054,495 B2 | Page 1 of 1 |
| APPLICATION NO. | : 10/820630 | |
| DATED | : November 8, 2011 | |
| INVENTOR(S) | : Ira Goldstein et al. | |

It is certified that error appears in the above-identified patent and that said Letters Patent is hereby corrected as shown below:

In column 34, line 4, in Claim 1, before "(ii)" insert -- with --.

In column 35, line 19, in Claim 11, above "in which said identity code" delete "in which said identity code with the digital paper;".

Signed and Sealed this
Eighteenth Day of December, 2012

David J. Kappos
*Director of the United States Patent and Trademark Office*